(12) United States Patent
Knapp et al.

(10) Patent No.: US 8,764,264 B2
(45) Date of Patent: Jul. 1, 2014

(54) EDGE-LIT LUMINAIRE

(75) Inventors: Thomas Alexander Knapp, Cleveland, OH (US); Rick Dureiko, Willoughby, OH (US)

(73) Assignee: GE Lighting Solutions, LLC, Cleveland, OH (US)

( * ) Notice: Subject to any disclaimer, the term of this patent is extended or adjusted under 35 U.S.C. 154(b) by 249 days.

(21) Appl. No.: 13/363,881

(22) Filed: Feb. 1, 2012

(65) Prior Publication Data

US 2013/0088890 A1 Apr. 11, 2013

Related U.S. Application Data

(60) Provisional application No. 61/545,708, filed on Oct. 11, 2011.

(51) Int. Cl.
*F21V 7/04* (2006.01)
(52) U.S. Cl.
USPC .......................................... 362/609; 362/604
(58) Field of Classification Search
USPC .................. 362/604, 630, 560, 609
See application file for complete search history.

(56) References Cited

U.S. PATENT DOCUMENTS

| | | | |
|---|---|---|---|
| 5,613,751 A | 3/1997 | Parker et al. | |
| 5,636,914 A * | 6/1997 | Trusiani | 362/604 |
| 5,947,578 A | 9/1999 | Ayres | |
| 6,001,210 A | 12/1999 | Ayres | |
| D433,520 S | 11/2000 | Wang | |
| D443,095 S | 5/2001 | McMahon | |
| 6,305,109 B1 | 10/2001 | Lee | |
| 6,705,033 B1 * | 3/2004 | Greene et al. | 40/546 |
| 7,186,014 B2 | 3/2007 | Shimura | |
| D543,305 S | 5/2007 | Wang | |
| 7,366,393 B2 | 4/2008 | Cassarly et al. | |
| 7,384,179 B2 | 6/2008 | Sakai | |
| 7,452,109 B2 | 11/2008 | Noh et al. | |
| 7,572,045 B2 | 8/2009 | Hoelen et al. | |
| 7,600,908 B2 * | 10/2009 | Chang et al. | 362/623 |

(Continued)

FOREIGN PATENT DOCUMENTS

| | | |
|---|---|---|
| JP | 20070219431 A | 8/2007 |
| JP | 20090244501 A | 10/2009 |
| JP | 20110095606 A | 5/2011 |

OTHER PUBLICATIONS

US 7,684,107, 8/2010, (withdrawn).

(Continued)

*Primary Examiner* — Anne Hines
(74) *Attorney, Agent, or Firm* — Pearne & Gordon LLP

(57) ABSTRACT

An edge lit luminaire includes a light source. A housing has an interior cavity for receiving the light source. The housing includes a heat sink for directing heat away from the light source. At least one optional end cap is secured to an end of the housing that covers the cavity. A lightguide is secured inside the housing and has an edge located in proximity to the light source. At least one of a reflector and a lens (e.g., lens optic) directs light from the light source to the edge of the lightguide. The lightguide includes a light extraction surface enabling light to be transmitted from the lightguide. The housing can also feature a channel and slot for mounting the luminaire to a support surface. The lens optic can be designed to have specific dimensions that facilitate efficient design and operation of the luminaire.

34 Claims, 19 Drawing Sheets

(56) References Cited

U.S. PATENT DOCUMENTS

| | | | |
|---|---|---|---|
| 7,618,179 B2 | 11/2009 | Miyashita | |
| D607,915 S | 1/2010 | Fong | |
| 7,661,849 B2 | 2/2010 | Lo et al. | |
| D611,633 S | 3/2010 | Thomson et al. | |
| 7,681,347 B1 * | 3/2010 | Welker et al. | 40/546 |
| 7,695,182 B2 | 4/2010 | Iwasaki | |
| 7,706,050 B2 | 4/2010 | Sampsell | |
| D616,137 S | 5/2010 | Bucher et al. | |
| 7,740,375 B2 | 6/2010 | Zou et al. | |
| 7,766,498 B2 | 8/2010 | Sampsell | |
| 7,766,531 B2 | 8/2010 | Anderson et al. | |
| 7,766,534 B2 | 8/2010 | Iwasaki | |
| 7,780,330 B2 | 8/2010 | Aylward et al. | |
| 7,780,331 B2 | 8/2010 | Ohmori | |
| D624,671 S | 9/2010 | Greene et al. | |
| D626,278 S | 10/2010 | Sabernig | |
| 7,824,093 B2 | 11/2010 | Kim et al. | |
| 7,855,827 B2 | 12/2010 | Xu et al. | |
| 7,864,395 B2 | 1/2011 | Chui | |
| 7,876,489 B2 | 1/2011 | Gandhi et al. | |
| 7,909,482 B2 | 3/2011 | Veenstra et al. | |
| 7,909,496 B2 | 3/2011 | Matheson et al. | |
| 7,914,197 B2 | 3/2011 | Naijo et al. | |
| 7,922,381 B2 | 4/2011 | Han et al. | |
| 7,931,396 B2 | 4/2011 | Suckling et al. | |
| 2007/0247870 A1 | 10/2007 | Sakai et al. | |
| 2008/0284308 A1 | 11/2008 | Pang | |
| 2009/0147538 A1 | 6/2009 | Wang et al. | |
| 2009/0244690 A1 | 10/2009 | Lee | |
| 2009/0316388 A1 | 12/2009 | Chang | |
| 2010/0014027 A1 | 1/2010 | Li et al. | |
| 2010/0033955 A1 | 2/2010 | Zhu et al. | |
| 2010/0033989 A1 | 2/2010 | Teng et al. | |
| 2010/0046217 A1 | 2/2010 | Ngai | |
| 2010/0085773 A1 | 4/2010 | Richardson | |
| 2010/0201613 A1 | 8/2010 | Kamada | |
| 2010/0220497 A1 | 9/2010 | Ngai | |
| 2010/0294001 A1 | 11/2010 | Page et al. | |
| 2010/0309409 A1 | 12/2010 | Starkey et al. | |
| 2010/0328576 A1 | 12/2010 | Kinoshita | |

OTHER PUBLICATIONS

PowerPoint slide presentation for LED edge-lit luminaire shown by GE Lighting at Light Fair in Philadelphia, PA in May 2011.

EP Search Report dated Nov. 7, 2013, from corresponding EP Patent Application No. 12187846.6.

\* cited by examiner

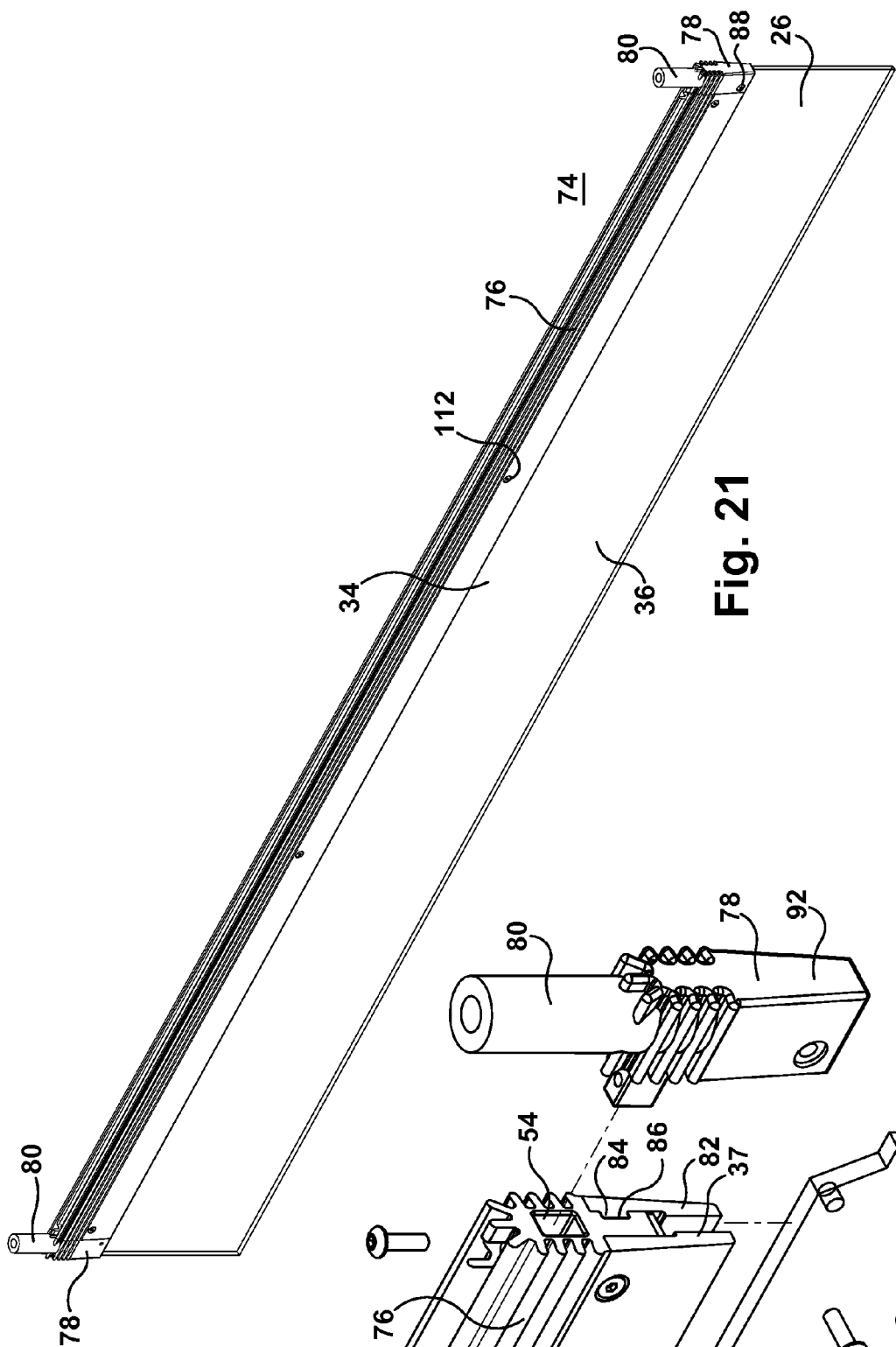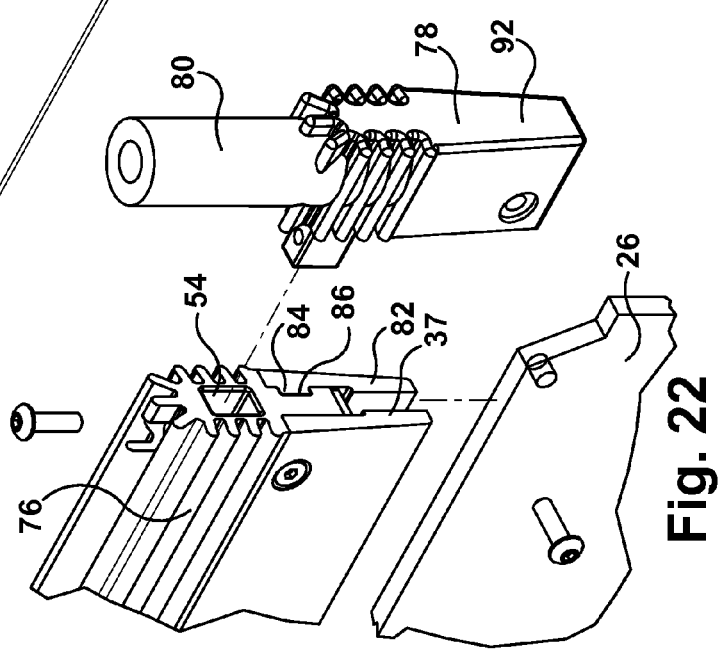
Fig. 21
Fig. 22

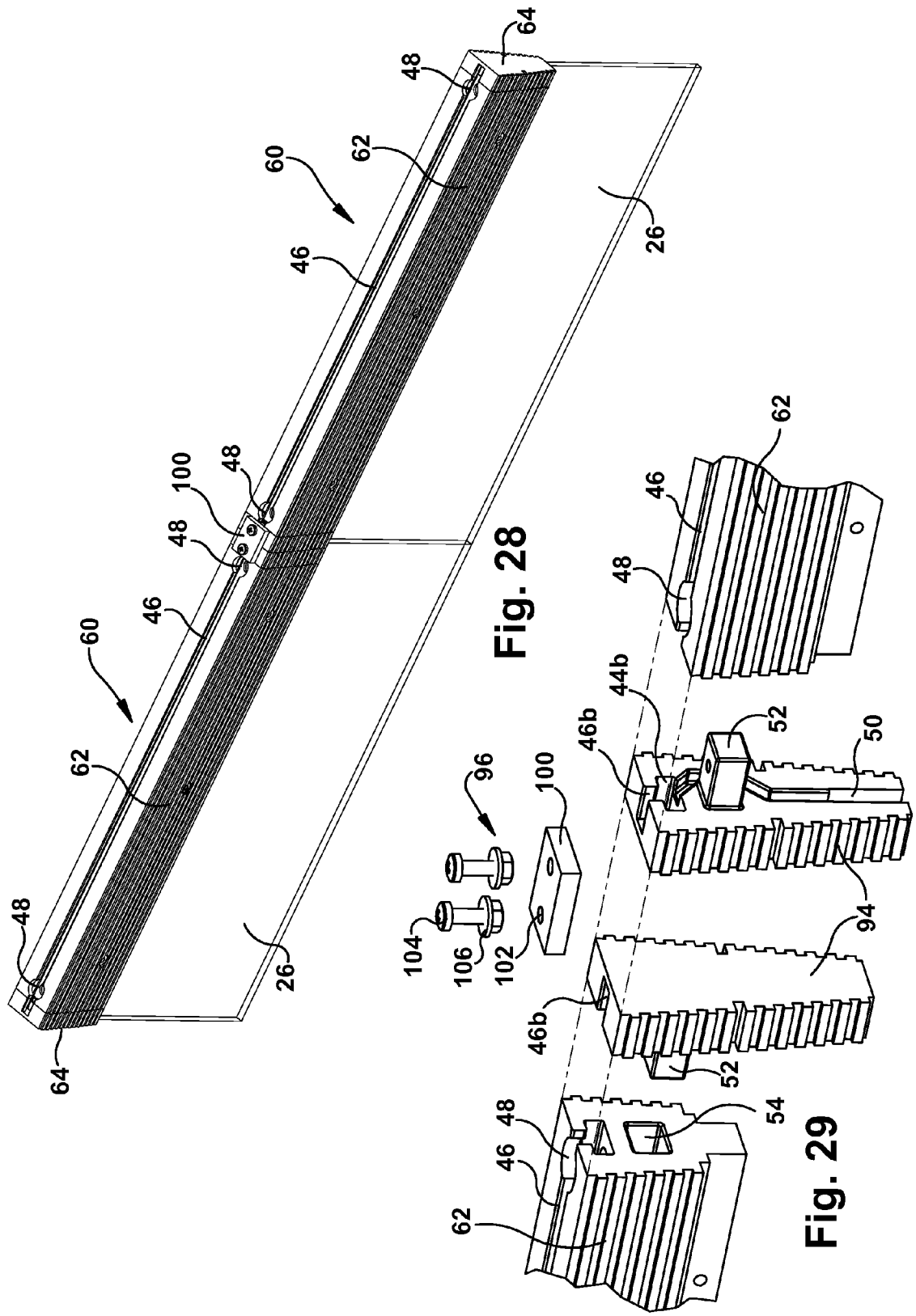

EDGE-LIT LUMINAIRE

FIELD OF THE INVENTION

This disclosure is directed to an edge-lit luminaire for general illumination, which includes a lightguide coupled with a light source (e.g., linear LED light engine) at the edge of the lightguide, with mechanical and thermal stability provided in one aspect by a heat sink with at least one end cap.

BACKGROUND OF THE INVENTION

Edge-lit technology incorporates a light source coupled to a light-guiding member that utilizes total internal reflection (TIR) to direct light from the light source to the desired application space. Various forms of this technology have been introduced in applications that include signs, flat-screen televisions, laptops, mobile phones, luminaires, and other displays. Fluorescent and LED light sources are common for these applications because they can be made to fit in confined fixtures. A slender light source combined with a thin light-guiding member, or lightguide, allows for displays to maintain very low profiles, which is a desirable aesthetic and physical feature for many of the aforementioned applications. In particular, the rise of the LED as a cost-effective light source in recent years has brought opportunities for sleek luminaires which are both energy efficient and long lasting to illuminate commercial and retail space.

A common type of edge-lit luminaire is the recessed troffer, which is a luminaire that is usually intended for drop ceilings in commercial and retail space. These luminaires are only visible from below, so it is not especially critical what the luminaire looks like on the sides or back since it is covered by the ceiling. The luminaire can therefore be fastened together in any number of means which may otherwise be aesthetically unappealing when compared with a suspended or surface-mounted luminaire. Additionally, these luminaires have back panels that span the area of the luminaire, which is typically on the order of 2-8 square feet. The large area offers an advantage in designing for mechanical stability and dissipation of heat generated by the light source(s). A disadvantage of the edge-lit recessed troffer is the restrictive design space in which to direct light from the source to the desired application space. This design space is in part governed by the height of the ceiling and the dimensions of the ceiling grid. These parameters must often be accounted for in the luminaire design prior to commercialization because the luminaire's intended light distribution is not necessarily adjustable for all ceiling heights once it is manufactured. By contrast, suspended and surface-mounted luminaires have more flexibility in mounting location because the end-user can mount the luminaire to any desired height. This flexibility of mounting location brings more scrutiny to the aesthetic of the suspended or surface-mounted luminaire since it is visible from most or all angles and not hidden in a ceiling.

Another application of the edge-lit luminaire is in signage. A familiar example is the edge-lit "EXIT" sign, which features a surface-mounted housing, a light source, and a lightguide. These signs serve an essential safety function and are not designed for large area illumination as recessed troffers and other edge-lit luminaires often are. Additionally, they are not heavily scrutinized for all aesthetic qualities, particularly with respect to bright spots created by LED light sources. Luminaires which are visible from nearly all angles, e.g. suspended or wall-mounted luminaires, are desired to have a uniform luminance while illuminating a large area with a specified light level.

BRIEF DESCRIPTION

The following is a brief description of the edge lit luminaire of this disclosure including specific features thereof. Any of the features of the detailed description may be used in any combination with the features discussed here.

A first aspect of this disclosure features an edge lit luminaire including a light source. A housing has an interior cavity for receiving the light source. The housing includes or is a heat sink for directing heat away from the light source. At least one end cap is secured to an end of the housing that covers the cavity. A lightguide is secured inside the housing and has an edge located in proximity to the light source. At least one of a reflector and a lens directs light from the light source to the edge of the lightguide. The lightguide includes a light extraction surface enabling light to be transmitted from the lightguide.

Referring to specific features of the first aspect, the light source can include a plurality of spaced apart light emitting diodes (LEDs). The LEDs can be mounted on a printed circuit board, for example, a metal-clad printed circuit board (PCB) or an unclad polymeric PCB. The housing and the end cap(s) can include a plurality of fins at exterior surfaces thereof; and fins of the end cap(s) are aligned with the fins of the housing. The housing can have an hourglass shape or a trapezoid shape, for example, as viewed from the ends of the housing. The lightguide can have a planar or tapered shape, for example. A width of the lightguide extends between two spaced apart ends of the lightguide and the housing is disposed at only one of the ends. That is, only one end of the lightguide is covered by the housing. The housing can include a removable side section permitting access to the cavity. A connecting member or end cap can join two housings placed end to end. On the other hand, one luminaire can include a boss and another luminaire can be joined to it with a recess without using end caps between the luminaires. In this case, each luminaire can include one terminating end cap covering the recess.

The housing can include opposing first and second surfaces. The lightguide can be received in an opening in the second surface. A channel can be disposed in the housing near the first surface that can receive a head of a fastener for mounting the luminaire to a support surface. A slot can be disposed in the first surface in communication with and a smaller size than the channel for receiving a shank of the fastener. The first surface can include an opening that is larger than a head of the fastener, the opening communicating with the channel. A passageway can communicate inside the housing between the channel and the cavity; whereby the passageway receives electrical wires connected to leads that are electrically connected to the light source. One of the housing and each of the end caps can include a boss and the other of the housing and each of the end caps can include an opening for receiving the boss. A film can be disposed on the lightguide, the film including letters, symbols, or graphics printed, engraved, or embossed thereon.

A second aspect of this disclosure features an edge lit luminaire including a plurality of spaced apart light emitting diodes (LEDs). The LEDs are mounted on a support surface, for example, an optional printed circuit board. A housing has an interior cavity for receiving the LEDs and in which the support surface is located. The housing includes or is a heat sink for directing heat away from the LEDs. At least one end cap is secured to an end of the housing and covers the cavity. A lightguide is secured inside the housing and has an edge located in proximity to the LEDs. At least one of a reflector and a lens directs light from the LEDs to the edge of the lightguide. The lightguide includes a light extraction surface enabling light to be transmitted from the lightguide.

Referring to specific features of the second aspect, any of the specific features of the first aspect are applicable to the second aspect in any combinations. Moreover, the LEDs can be spaced apart from each other by a pitch length; and a first LED closest to the end caps is disposed at a distance D1 of between ½ and 1 pitch length from an end of the end caps. In addition, a first of the LEDs in adjacent housings can be spaced apart from each other by a distance D2 ranging between one and two pitch lengths. A film can be disposed on the lightguide, the film including letters, symbols, or graphics printed, engraved, or embossed thereon.

A third aspect of this disclosure features an edge lit luminaire including a plurality of spaced apart light emitting diodes (LEDs). The LEDs are mounted on a support structure. A housing has an interior cavity for receiving the LEDs and in which the support structure is located. The housing includes or is a heat sink for directing heat away from the LEDs. The housing includes opposing first and second surfaces and a channel disposed in the housing near the first surface that can receive a fastener for mounting the luminaire to a support surface. A slot is disposed in the first surface in communication with and a smaller size than the channel for receiving a shank of the fastener. A lightguide is disposed in an opening in the second surface of the housing and has an edge located in proximity to the LEDs. At least one of a reflector and a lens directs light from the LEDs to the edge of the lightguide. The lightguide includes a light extraction surface enabling light to be transmitted from the lightguide. Any of the specific features of the first or second aspects are applicable to the third aspect in any combinations.

A fourth aspect of this disclosure features an edge lit luminaire comprising a plurality of spaced apart light emitting diodes (LEDs) disposed on a support structure. The LEDs are spaced apart from each other by a pitch length. A housing has an interior cavity for receiving the LEDs and in which the support structure is located. The housing includes or is a heat sink for directing heat away from the LEDs. A lightguide is disposed in an opening in a surface of the housing and has an edge located in proximity to the LEDs. At least one of a reflector and a lens optic directs light from one of the LEDs to the edge of the lightguide. The lightguide includes a light extraction surface enabling light to be transmitted from the lightguide. The optic has a length that is less than or equal to the pitch length and a width that is less than or equal to a width of the edge. Regarding specific features of the fourth aspect, any of the specific features described in connection with the first through third aspects may be used in any combination. Further, each LED can comprise an optic dome. The optic includes a cup surrounding the LED. A depth of the cup is approximately equal to a depth of the dome of the LED. Moreover, fasteners can be used for mounting the printed circuit board to the housing between the LEDs. Each fastener has a head. The length of the optic is less than the pitch length by a distance that is greater than or equal to a diameter of the head of the fastener. The support structure can comprise a printed circuit board on which the LEDs can be mounted. A mixing zone height H can be located between an apex of the LEDs to an outer surface of the housing at the opening; wherein H/P is greater than about 0.8 and, in particular, H/P ranges from 0.8 to 1. A film can be disposed on the lightguide, the film including letters, symbols, or graphics printed, engraved, or embossed thereon.

A fifth aspect of this disclosure features an edge lit luminaire comprising a light source. A housing has an interior cavity for receiving the light source. The housing includes or is a heat sink for directing heat away from the light source. A lightguide is secured inside the housing and has an edge located in proximity to the light source. At least one of a reflector and a lens directs light from the light source to the edge of the lightguide. The lightguide includes a light extraction surface enabling light to be transmitted from the lightguide. A film or plate is disposed on at least one side surface of the lightguide. The film includes letters, symbols, or graphics printed, engraved or embossed thereon. A clip is secured to an edge of the lightguide remote from the housing that retains the film or plate against the lightguide. The light source can include LEDs mounted on an optional printed circuit board positioned in the cavity. The film or plate is light transmitting.

Many additional features, advantages and a fuller understanding of the invention will be had from the accompanying drawings and the Detailed Description of the Invention that follows. It should be understood that the above Brief Description of the Invention describes the invention in broad terms while the following Detailed Description of the Invention describes the invention more narrowly and presents embodiments that should not be construed as necessary limitations of the broad invention as defined in the claims.

BRIEF DESCRIPTION OF THE DRAWINGS

FIG. 21 shows a perspective view of an edge lit luminaire of a third embodiment having a different profile of the housing;

FIG. 22 shows fitting of an end cap into the housing of the edge lit luminaire of the third embodiment;

FIG. 28 is a perspective view of two luminaires of the second embodiment connected together with two connected terminating end caps shown in FIG. 29;

DETAILED DESCRIPTION

Figure 1:
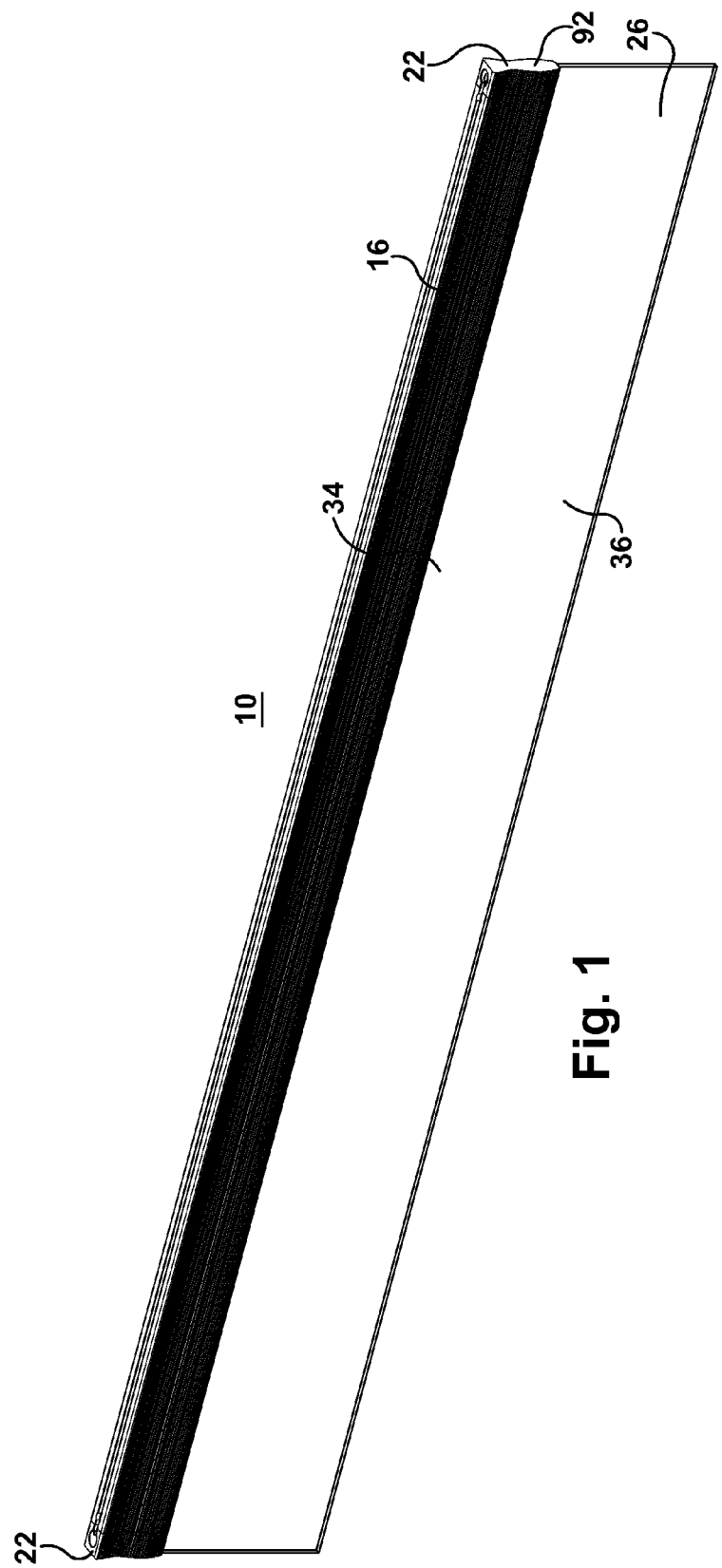
FIG. 1 is a perspective view of an edge lit luminaire of a first embodiment of this disclosure.
Figure 2:
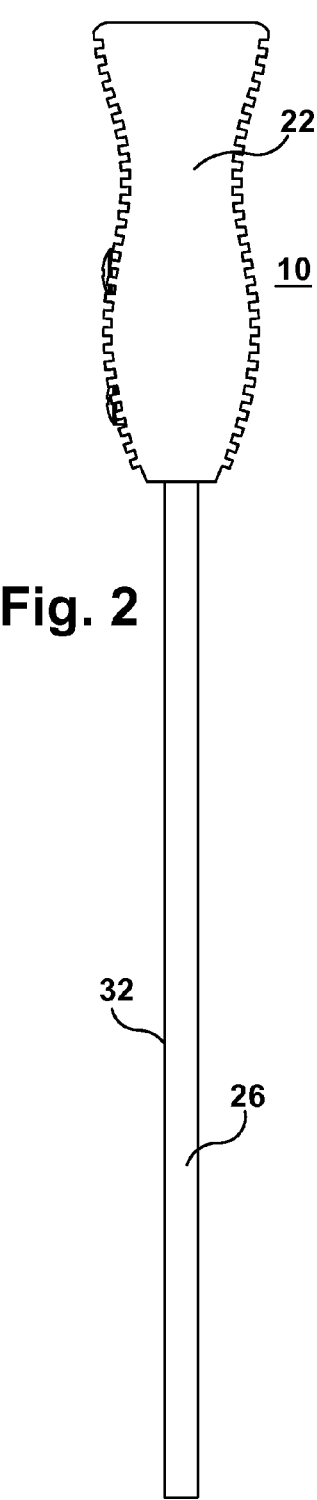
FIG. 2 is an end view of the edge lit luminaire of the first embodiment of this disclosure having an hourglass shape in side profile.

Turning to a first embodiment shown in FIGS. 1-9, more detailed features of the LED edge lit luminaire 10 will now be described. The edge lit luminaire 10 includes a plurality of spaced apart light emitting diodes (LEDs) 12, a first or outermost LED being labeled LED 12a. The LEDs are mounted on a support structure located in the cavity, the support structure comprising, for example, a printed circuit board 14. A housing 16 has an interior cavity 18 for receiving the LEDs 12 and the circuit board 14. The housing 16 includes a heat sink (or is a heat sink) for directing heat away from the LEDs. The housing includes a plurality of fins 20 at an exterior surface thereof. End caps 22 secured to ends of the housing cover the cavity 18 at the ends of the housing. The end caps 22 include a plurality of fins 24 at an exterior surface thereof. A lightguide 26 is secured inside the housing 16 and has an edge 28 located in proximity to the LEDs 12. At least one of a reflector and a lens 30 directs light from the LEDs to the edge of the lightguide. The lightguide includes a light extraction surface 32 enabling light to be transmitted from the lightguide.

The term, printed circuit board, may refer to any of a rigid metal-clad printed circuit board, a rigid polymeric printed circuit board, a flexible metal-clad printed circuit film, and a flexible polymeric printed circuit film. Any of these PCB variations may be secured to the heat sink with any one or more of a threaded fastener, grease, pressure-sensitive adhesive (e.g. tape), or cured adhesive (e.g. epoxy). The interface between the PCB and the heat sink, i.e. the grease or adhesive, preferably has good thermal conductivity properties, low thermal contact resistance to effectively dissipate the heat in the LEDs to the heat sink, and high electrical contact resistance to electrically insulate the PCB from the heat sink.

Figure 3:
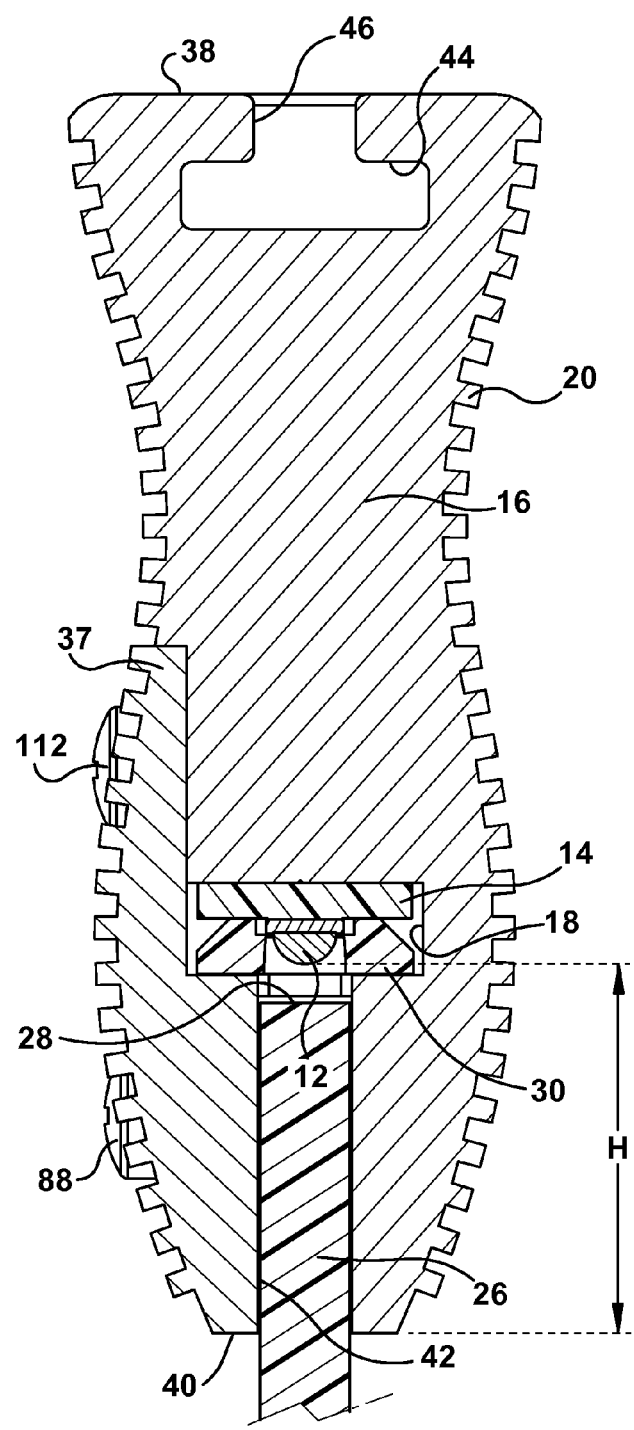
FIG. 3 is an enlarged cross-sectional view of the edge lit luminaire of the first embodiment.

Referring to more specific features of the LED edge lit luminaire 10, the circuit board is metal clad. The fins 24 on the end caps 22 are aligned with the fins 20 of the housing 16. The housing 16 can have an hourglass shape as viewed from the ends of the housing (FIGS. 1 and 3). The lightguide 26 has a planar shape. A shorter dimension of width of the lightguide extends between two spaced apart ends 34, 36 of the lightguide and the housing is disposed, for example, at only one of the ends 34, not at any other end of the lightguide. In particular, no housing or heat sink is disposed at the other end 36 of the lightguide or on its edges or side surface near that end. The housing includes a removable side section, for example, removable front plate 37 (FIG. 3), on one or both sides permitting access to the cavity 18.

Figure 4:
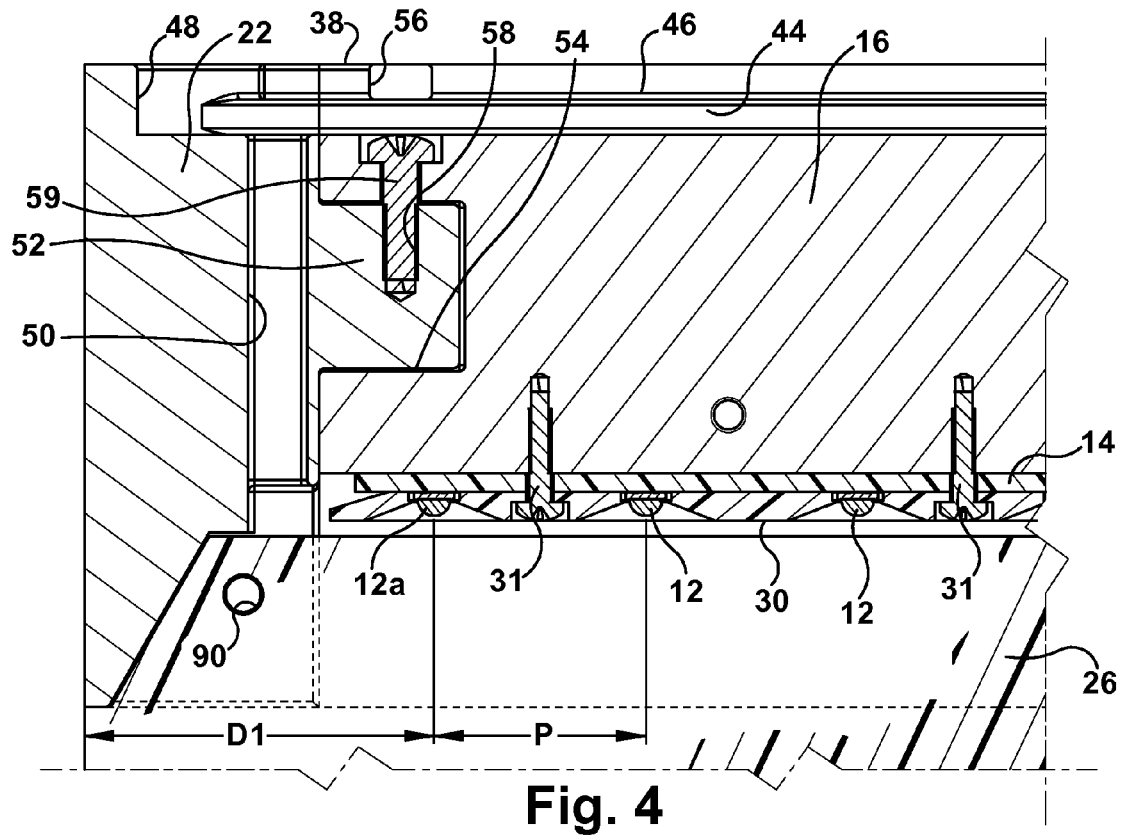
FIG. 4 is a cross-sectional view of a front of the luminaire showing a way to mount the end cap to the housing with a hidden fastener, a hole for mounting the lightguide in the housing, and fasteners for mounting the circuit board to the housing.
Figure 5:
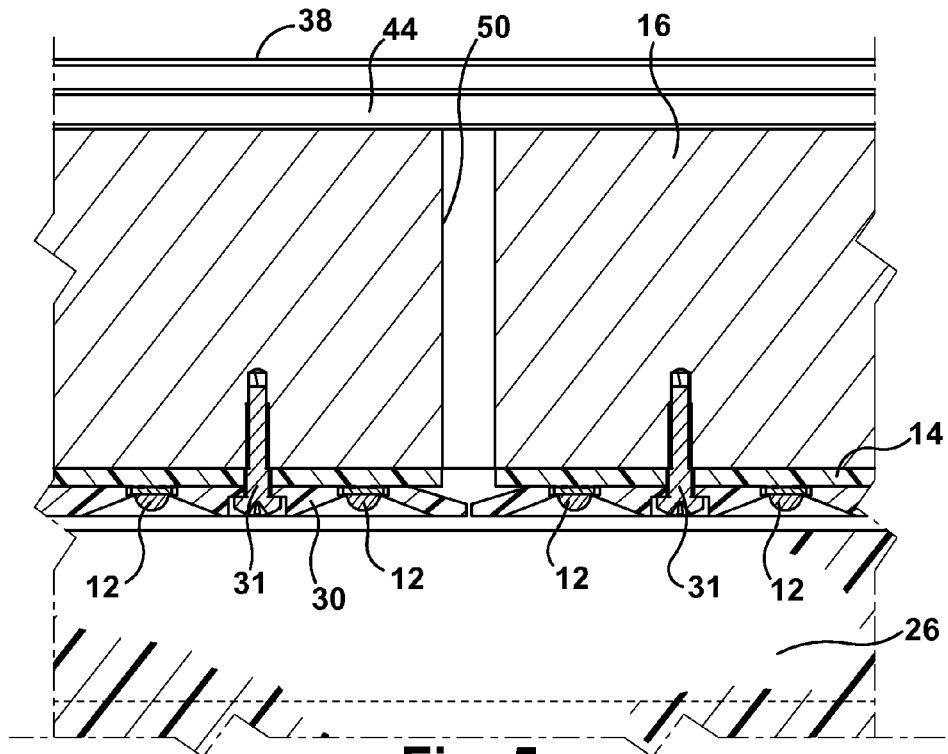
FIG. 5 is a cross-sectional view showing a central passageway between the channel and cavity for the circuit board and LEDs, which may receive wires connected to the circuit boards.
Figure 6:
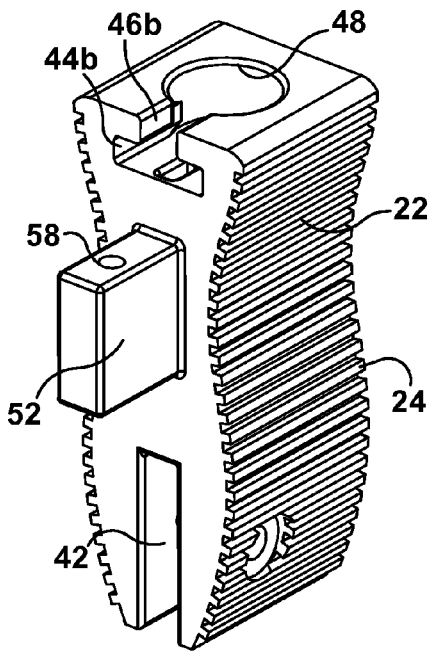
FIGS. 6-9 are perspective, front, top and cross-sectional views of an end cap that can be connected to the housing of the edge lit luminaire of the first embodiment.
Figure 8:
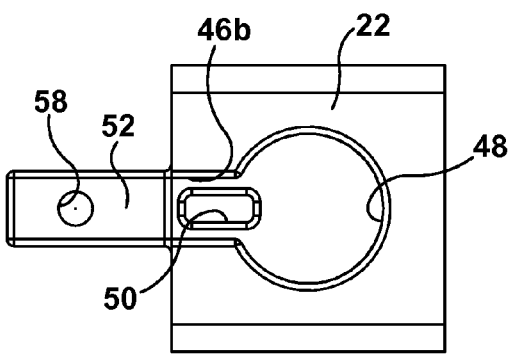
Figure 7:
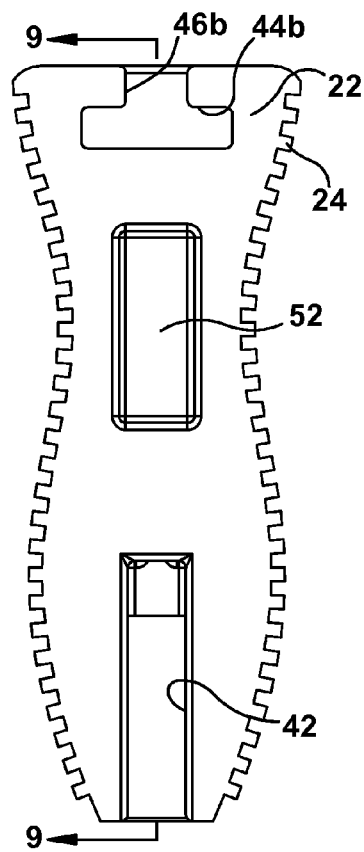

The housing includes opposing first and second surfaces 38, 40. The lightguide 26 is received in an opening 42 in the second surface. A channel 44 is disposed in the housing near the first surface 38 that can receive a head of a fastener for mounting the luminaire to a support surface. A slot 46 is disposed in the first surface 38 in communication with and a smaller size than the channel 44 for receiving a shank of the fastener. The first surface 38 includes an opening 48 (FIGS. 4 and 6) that is larger than a head of the fastener, which communicates with the channel 44. A passageway 50 communicates inside the housing 16 between the channel 44 and the cavity 18 (FIGS. 4 and 5). The passageway receives electrical wires connected to the LEDs or to leads of the circuit boards. One of the housing and each of the end caps (e.g., end cap 22) include a boss 52 and the other of the housing and each of the end caps (e.g., the housing 16) includes an opening 54 for receiving the boss. An optional fastener opening 56 extends from the first surface 38, through the housing or the end caps and into the boss 52 (FIG. 4). The fastener opening 56 can optionally be threaded in the boss (e.g., tapped portion 58). An optional hidden fastener 59 extending in each fastener opening 56 can secure the end caps to the housing.

A second embodiment of the edge lit luminaire 10 is shown in FIGS. 10-20) where like parts are given the same reference numerals as the first embodiment throughout the several views. Some of the features shown only in the figures of the second embodiment are applicable to or interchangeable with those of the first embodiment (or third embodiment discussed below). In this design the housing 62 and end caps 64 have a trapezoidal shape in an end profile. The housing may include a cutout 66 (FIG. 11) for reducing the bulk of the housing. A device for attaching the luminaire to a ceiling includes a suspension wire 68 to which is secured a clutch mechanism 70. A machine screw (e.g., M4) 72 is fastened to the clutch mechanism 66 and can include a shakeproof washer. The head of the screw 72 passes through the opening 48 into the channel 44, while the shank of the fastener extends across the slot 46. The clutch mechanism can then be slid in the channel 44 along the length of the housing until a desired attachment position is reached.

A third embodiment is shown in FIGS. 21-24. The luminaire 74 of this design has a different shape of the housing 76 and end caps 78 than in the first and second embodiments. Not all of the housing includes the fins as not all of the housing needs to function as a heat sink. A conduit 80 can be inserted into the housing 76 for containing the electrical wires between the LEDs (leads of the circuit boards) and power source and/or can be replaced by the supporting wire 68 and clutch mechanism 70. If the hole in the end cap is threaded, a hollow stud may be inserted in place of conduit 80. This allows the wire to go through the stud while the stud makes a mechanical connection to the end cap. Alternatively, the wire channel is in the end cap and the conduit 78 just accommodates a stud or cable gripper mechanism.

Figure 24:
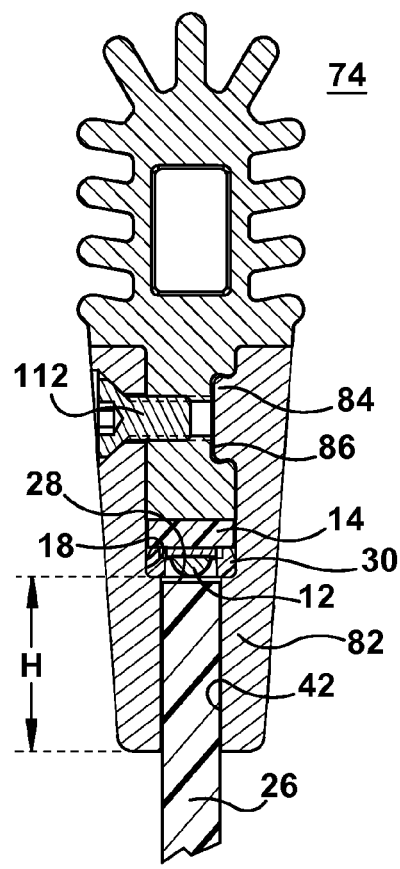
FIG. 24 is a cross-sectional view showing the cavity in the housing that receives the circuit board and LED and the light guide fastened in the housing of the luminaire of the third embodiment.

FIGS. 22 and 24 shows the removable front plate 37 and a removable rear plate 82 with a tab feature 84 that mates with a recess 86 in the primary housing 76. This tab may be tapered in a way that the rear plate (and optionally the front plate) may slide in only from the end of the heat sink. This reduces the number of fasteners required to fasten the rear (and front) plates to the heat sink. If a tight fit or interference fit is utilized in sliding the plates in to the heat sink, the end caps will secure the ends sufficiently such that no fasteners are needed to fasten the removable plates to the heat sink.

In particular, the following discusses further details of LED edge lit luminaires applicable to all embodiments of this disclosure.

Figure 13A:
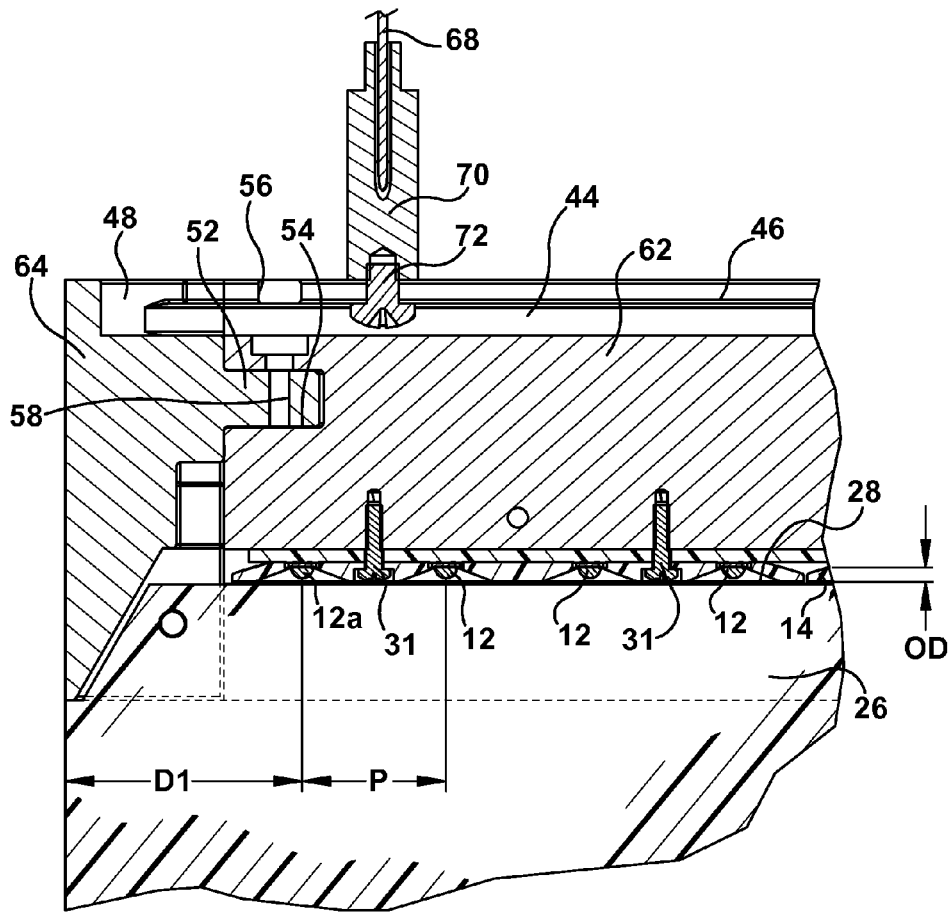
FIG. 13A is a cross-sectional view of the luminaire of the second embodiment showing a terminating end cap fitting into the housing.
Figure 27:
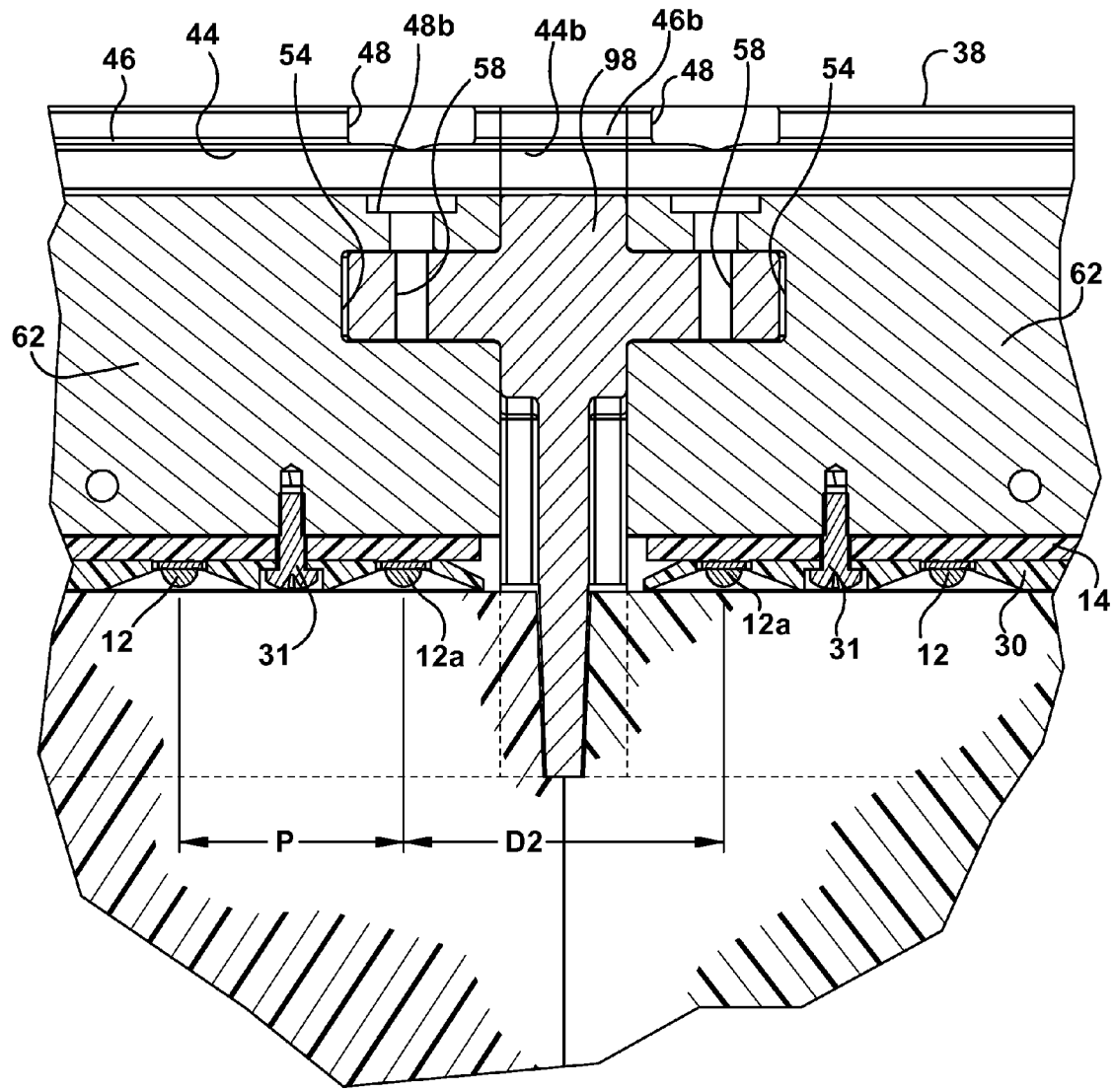
FIG. 27 shows a cross-sectional view of the two luminaires and connecting end cap.

Optical Path:

The optical system of the luminaire comprises a light engine, the reflector and/or lens cups 30, and the lightguide 26. The light engine includes a plurality of the LEDs 12 linearly arranged on the metal-clad printed circuit board 14 (MCPCB). The number of LEDs and MCPCBs in the system is governed by the desired amount of light output and the distribution of light desired. One embodiment for a 4 foot long luminaire with an output of 1800 lumens/ft at total system power of under 100 W comprises 64 LEDs and 4 MCPCBs (16 LEDs/MCPCB). The LEDs are more specifically spaced about 17-19 mm apart. The first LED 12a is located at a distance D1 of between one half and one LED pitch length (i.e., 8.5-19 mm in this embodiment) from the edge of the luminaire housing (including the terminating end cap) as shown in FIGS. 4 and 13A. Two luminaires that are butted together with a connecting end cap between them could have a distance D2 between the first or outermost LED 12a on one luminaire and the first or outermost LED 12a on the next luminaire ranging from one to two pitch lengths (FIG. 27). Mounted on each MCPCB are 4 reflector cups 30, for example. Each reflector cup is an elongated strip that surrounds four of the LEDs on each MCPCB. Fasteners 31 extend through the reflector/lens 30 and the PCB into the housing (FIG. 13). It is desirable for the reflector/lens 30 to have as few pieces as possible. Ideally, each MCPCB would have one reflector strip that covers all LEDs on that MCPCB. The reflector cup has several functions, including directing light into the lightguide, protecting the LEDs from the lightguide during thermal expansion, and creating a flame-retardant interface between the MCPCB and the lightguide. It is desirable that the reflector cups be made from a moldable polymer with high reflectance and high flame-resistance.

Figure 13B:
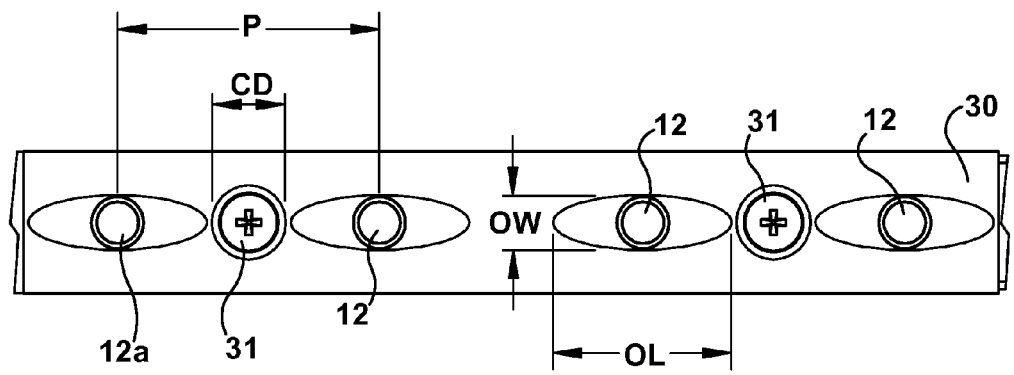
FIG. 13B is a top view of a reflector optic around the LEDs.
Figure 14:
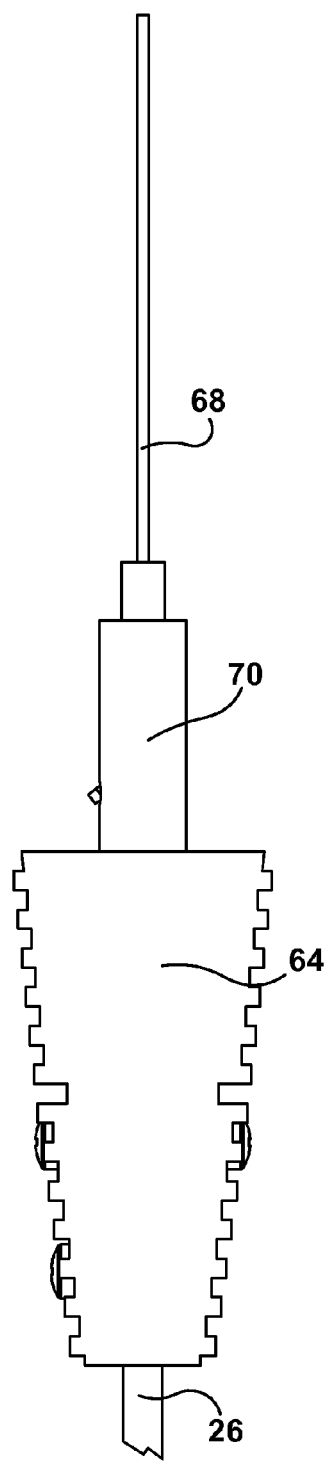
FIG. 14 is an end view of the housing of the edge lit luminaire of the second embodiment.

Referring to FIGS. 13A, 13B, the size of the reflector or lens optic around each LED is governed in this embodiment by the width of the lightguide 26, the size of the fasteners 31, and the size of the LED 12. The optic includes an oval or parabolic shaped cavity around the LED. The width of each optic OW ideally should not exceed the width of the lightguide so that light is not lost in the cavity 18. The length of each optic OL should not exceed the LED pitch length so that adjacent optics do not overlap each other. More preferably, the length OL of the optic is less than the LED pitch length P by a distance equal to or slightly greater than the counterbore major diameter around the fastener 31 (fastener head clearance diameter CD). Restricting the length of the optic OL in this fashion ensures that the optic does not overlap with the head clearance hole of the fastener 31. The depth of the optic OD should couple as closely to the LED as possible to avoid optical losses. However, sufficient mechanical tolerance must be given so the optic does not interfere with any part of the LED. This tolerance may be in the range of 0.05 mm to 0.5 mm but is not exclusive to that range. Due to the aforementioned size constraints placed on the optic OW, the shape of the optic, e.g. linear vs. parabolic surface curvature, is less sensitive to the overall luminaire optical efficiency, than in designs without these size constraints, as most of the light emitted from the LED is directly coupled into the lightguide and the shape of the optic surface does not significantly affect beam collimation.

The lightguide is a 4 mm thick (in one aspect) acrylic sheet that receives light from the light engine at the 4 mm thick inlet edge. Light losses are minimized the closer this inlet edge is to the LEDs. Most of the light is trapped inside the lightguide 26 due to total internal reflection (TIR) until the light contacts a defect or light-extracting feature (shown generally by 32) that redirects the light out of the lightguide. It is preferred that no light-extracting features are located between surface 40 and the inlet edge of the lightguide. This prevents light loss in the region 42 that is covered by the housing and removable plate(s). The height of the region 42, H, (FIGS. 3, 15 and 24) defines a mixing zone for light from the LEDs and is governed partly by the LED pitch length P (FIG. 4). When a series of two or more LEDs are located a large distance apart from each other, they appear as bright point sources, which is an unappealing aesthetic. These bright spots can be reduced by decreasing the pitch length P and increasing the height of the mixing zone H. The pitch length P is constrained by the number and cost of LEDs required to provide the desired light level. The mixing zone height H is further constrained by the desired vertical dimension of the housing 16. If LED bright spots are to be eliminated from nearly all viewing angles, it is desirable for the ratio H/P to be greater than about 0.8, so that if the pitch length P is 18 mm, the mixing zone height H is about 14.4 mm. The ideal ratio of H/P is between 0.8 and 1 to hide LED bright spots from the observer while maintaining a cost effective number of LEDs and housing size, but this range is not exclusive.

Figure 32:
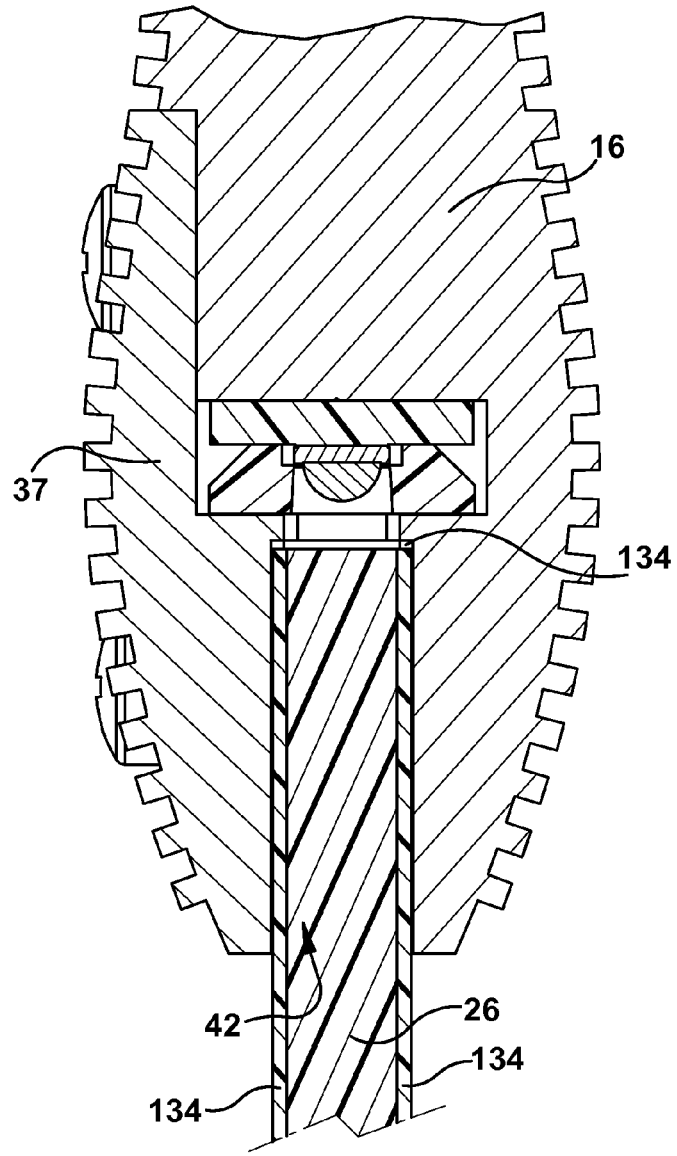
FIG. 32 is an enlarged cross-sectional view of the edge-lit luminaire of FIG. 31.
Figure 33:
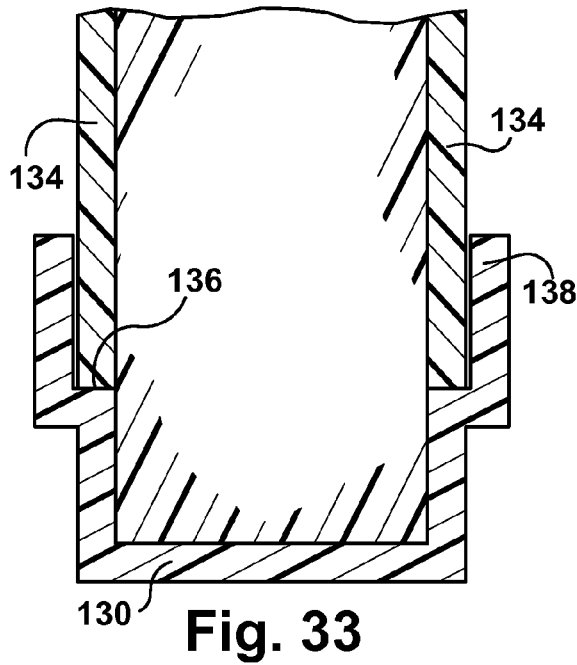
FIGS. 33-36 are cross-sectional views of various clips holding a film or plate onto the various lightguides.
Figure 34:
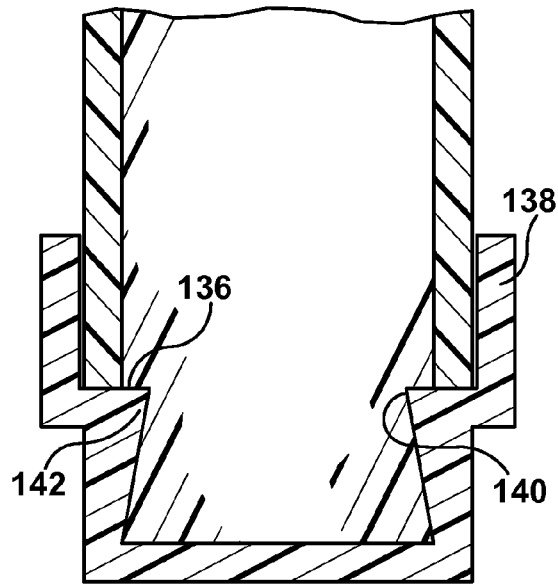
Figure 35:
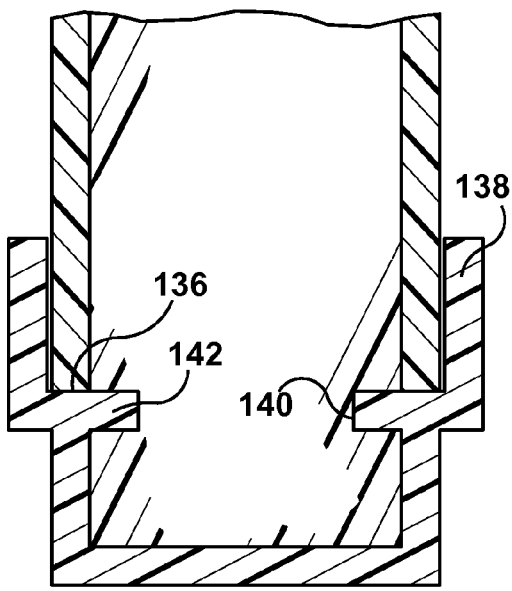
Figure 36:
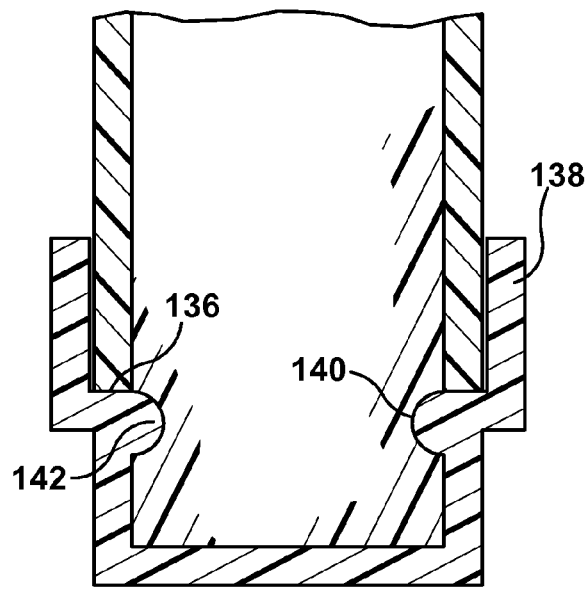
Figure 37:
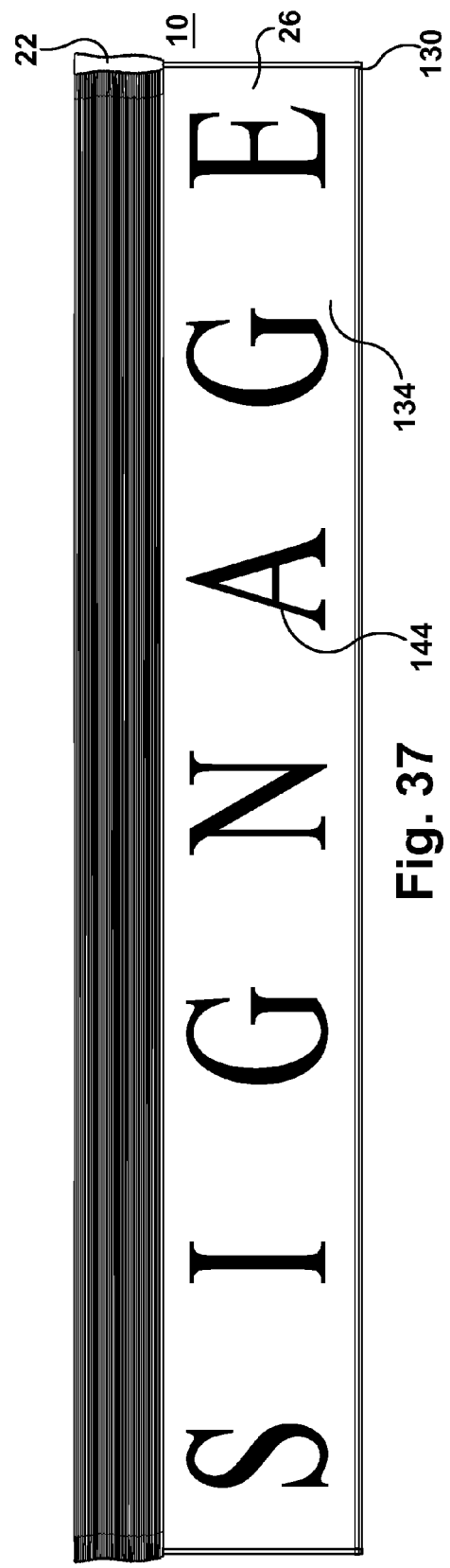
FIG. 37 is a perspective view of the edge-lit luminaire of FIG. 31 having signage on the film or plate.

Another feature of the invention is the option of adding signage to the lightguide 26. Signage may be achieved in numerous ways. First, at least one of the density and size of the light-extracting features may be manipulated in a way that forms prominent letters, symbols, or graphics. Alternatively, a film may be applied to the lightguide 26; the film having letters, symbols, or graphics printed, engraved, or embossed on the film. The film is preferably transparent to maintain the transparency of the lightguide 26 when the luminaire is turned off. The film may have a pressure sensitive adhesive or thermoplastic adhesive on one side of it to adhere to the lightguide prior to installing the lightguide in the housing 16. Alternatively, the film may have no adhesive and have the same perimeter and form as the lightguide (including corresponding through holes if applicable), such that the removable plates 37 and 82 compress the film against the lightguide 26 to hold the film in place in the region 42. Static adhesion may be desired to keep the film on the lightguide but is not a necessity. Referring to FIGS. 31-37, yet another method of adding signage is to provide a clip 130 on the bottom edge of the lightguide 26 and include a small gap around both sides of the lightguide in the region 42 between the removable plates 37, 82 and the lightguide 26 (or front removable plate 37 and the housing 16 if no rear removable plate is used) for sliding a plate or film 134 in close proximity to the lightguide and housing/housing plates. The plate or film 134 may be on one or both sides of the lightguide and in the example shown in FIG. 32 is on both sides and a top of the lightguide 26. The clip shown in FIG. 33 is a press fit clip. The clip may comprise a shelf 136 for the plate or film 134 to rest on and a lip 138 to prevent the plate or film from sliding off the edge of the shelf. The gap in the region 42 allows the plate or film to slide into position while preventing the plate or film from falling out.

The lightguide may include a groove 140 that can receive any of various shaped protrusions 142 so as to receive a tapered clip (FIG. 34) a plane notch clip (FIG. 35) or a round notch clip (FIG. 36), for example. One or more end caps 22 may be removed temporarily to switch out the plate or film 134 if a new sign is to be displayed on either or both sides of the lightguide. Alternatively, the signage plate or film 134 may be replaced with a protective plate or film 134, comprising a transparent substrate with no letters, symbols, or graphics 144 at all. The protective plate or film protects the lightguide from scratches, finger prints, and other undesirable defects both in handling the luminaire and in normal operation.

Figure 10:
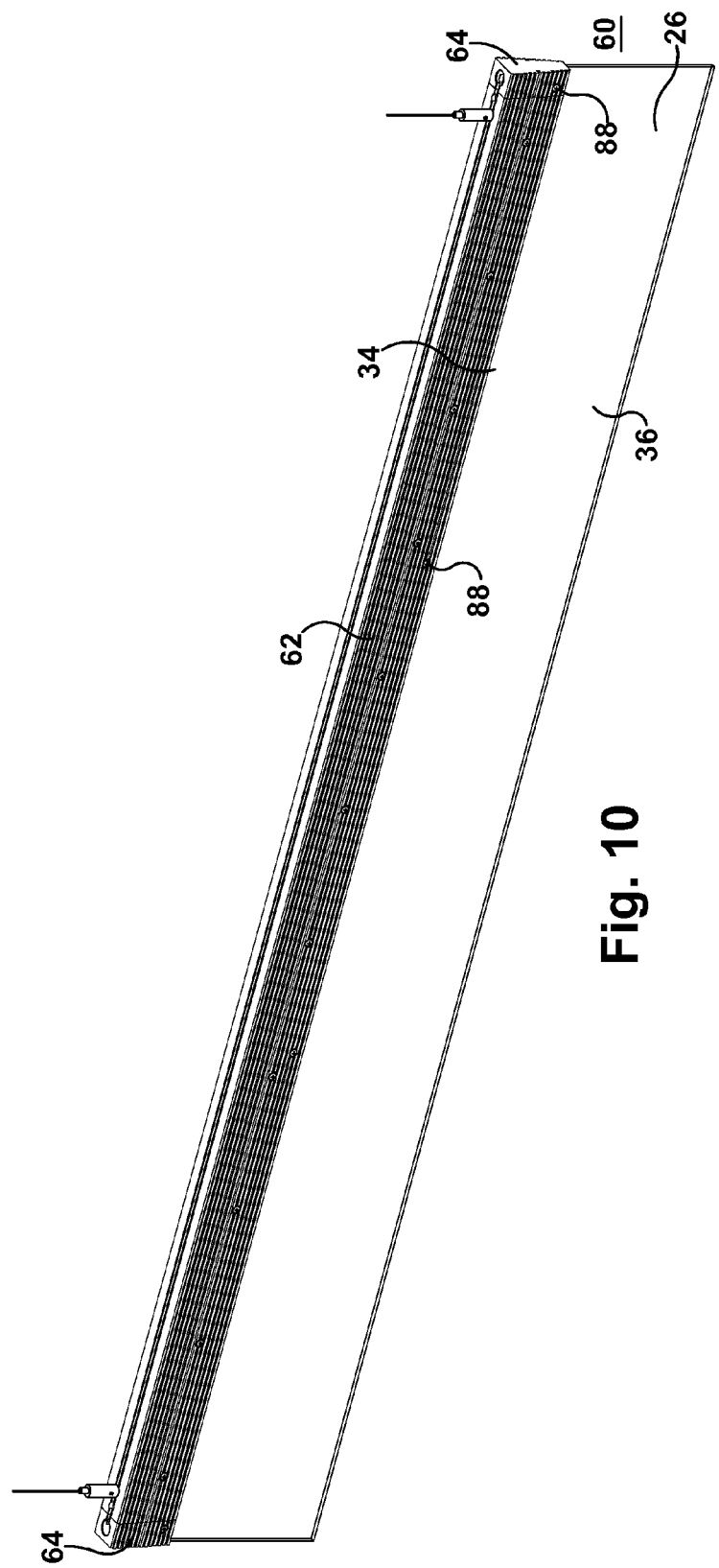
FIG. 10 is a perspective view of an edge lit luminaire of a second embodiment of this disclosure.
Figure 12:
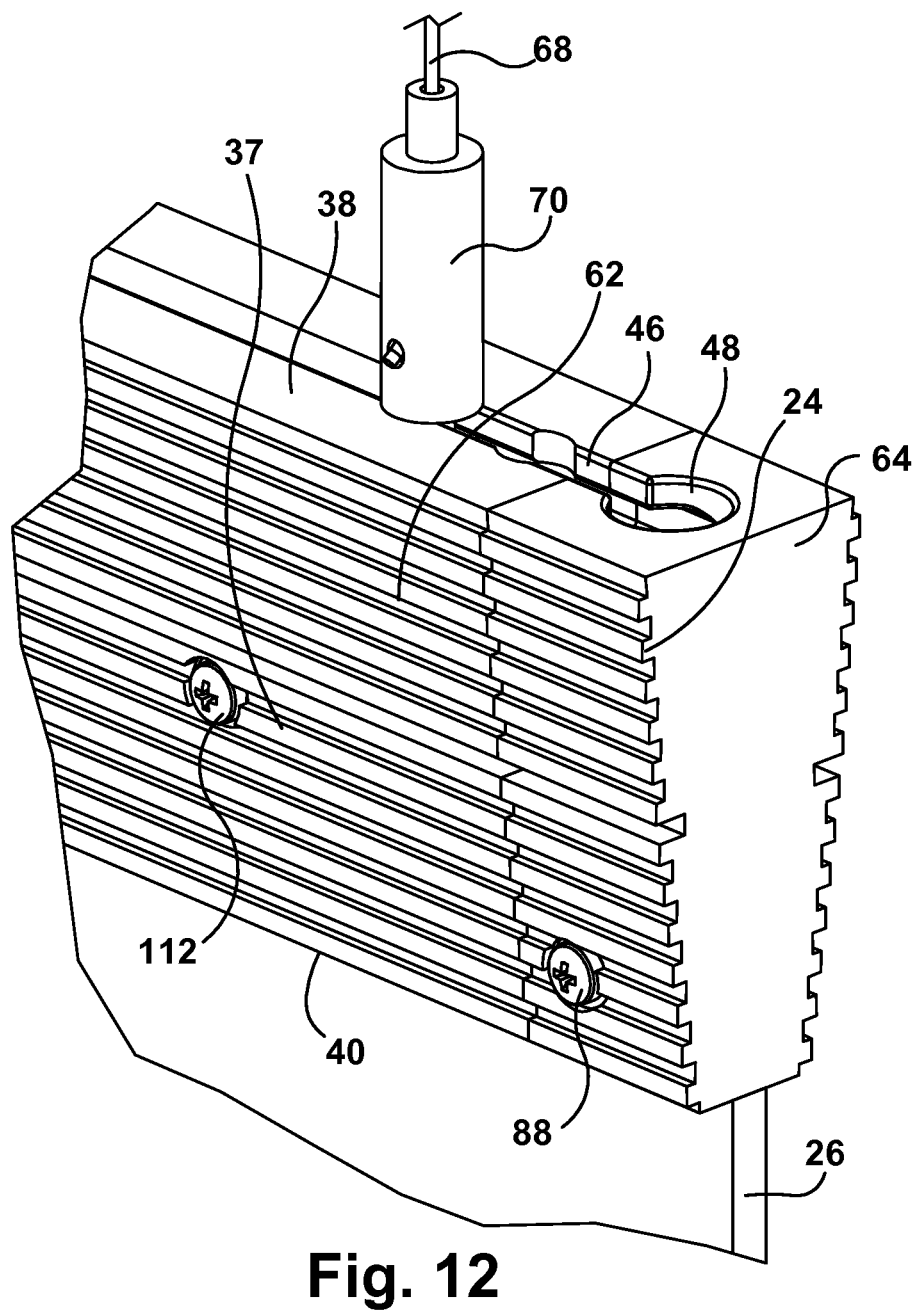
FIG. 12 shows an end view of the luminaire of the second embodiment.

Thermal Management:

The light engine of the luminaire generates a significant amount of heat that must be dissipated to the ambient. The heat sink 16, 62, 76 which the light engine is mounted on is designed to dissipate this heat efficiently without exceeding the size limitations of the luminaire and while maintaining an appearance that is aesthetically pleasing and low cost. The combination of superior thermal management, thin aesthetic profile, and cost-effectiveness is achieved by making the heat sink out of extruded aluminum that is painted white or silver or more specifically powder-coated white or silver with a high emissivity powder. The fins 20 provide increased surface area for better convection and radiation of thermal energy compared to a heat sink with no fin structure. Further, the top fin 86 on the front cover plate 37 makes a nearly invisible seam when the front plate is fastened to the bulk heat sink 16 (FIGS. 10 and 12).

Manufacturability:

One mode of manufacturing the heat sink 16, 62, 76 is by extruding aluminum, which is cost effective and can handle complex shapes. An alternative option is die-casting, which may be more expensive and more limiting in what shapes can be made. Both modes may require some post-processing to machine holes for threaded fasteners. The end caps 22, 64, 78, 94 and 98 may be die-cast or extruded. Extrusion matches the style and finish of the end cap to the heat sink, but will require more post-processing than a die-cast end cap. The lightguide can be manufactured by injection molding for speed and cost effectiveness.

Figure 9:
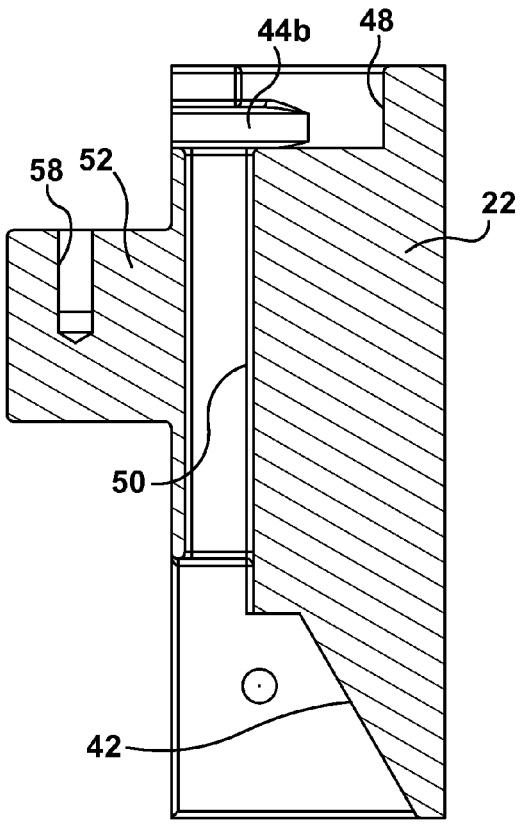
Figure 11:
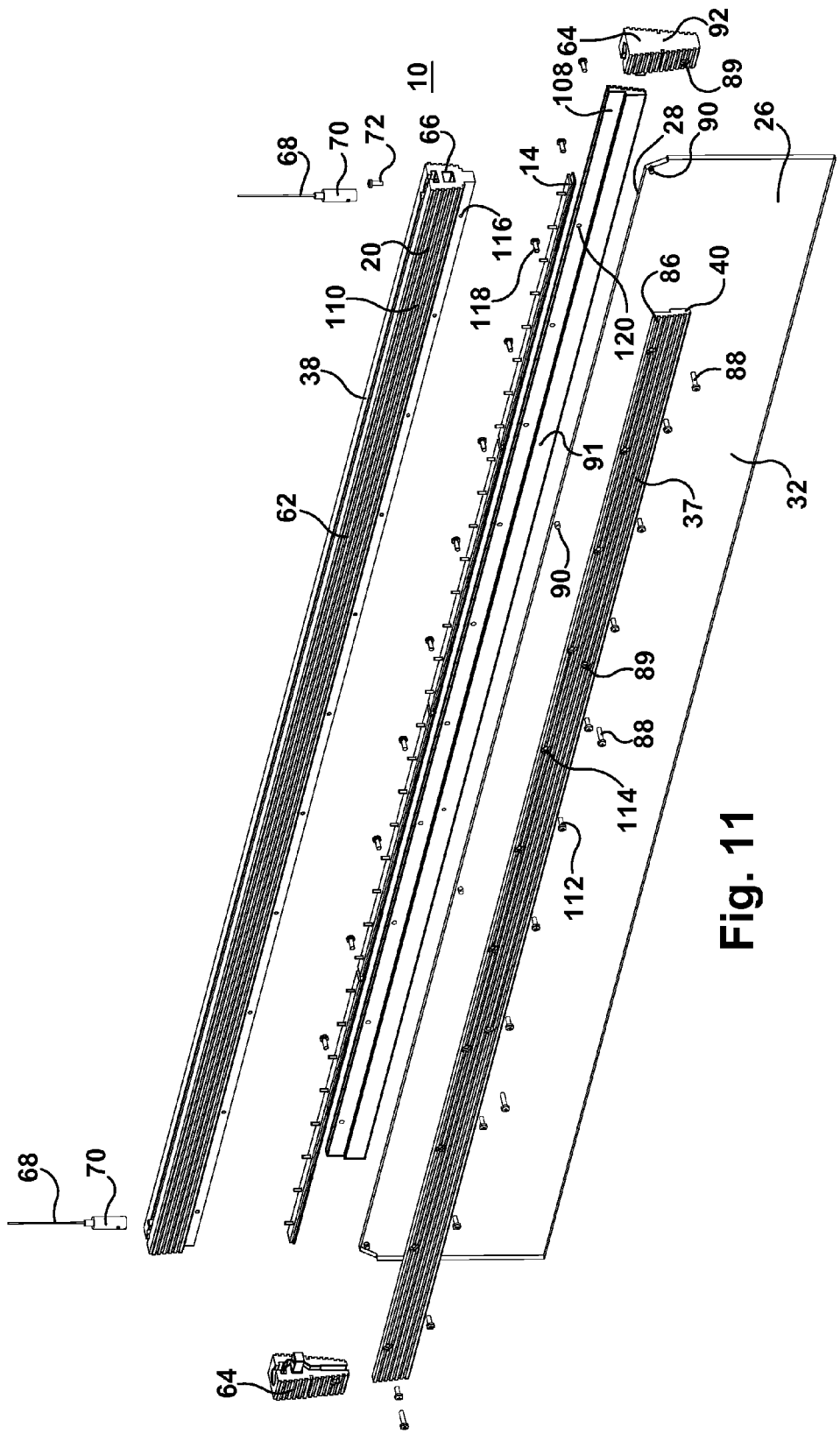
FIG. 11 shows an exploded perspective view of the luminaire of the second embodiment.

End Caps:

A purpose of the end cap is to cover the open end of the extruded heat sink (cavity 18 in the housing) where the light engine is mounted, which ensures safety and provides for a more aesthetic finish. All end caps of this disclosure can have an identical fin structure to the housing/heat sink so that the end cap seam is not noticeable (FIGS. 1, 10 and 12). The end caps include several features that enhance the performance and finish of the luminaire. First, the top face of the end cap (or housing/heat sink) may have an oversized hole 48 so that suspension/mounting hardware can be inserted into channel 44b on the end cap, the shank extending through slot 46b of the end cap. The fastener is then received in the channel 44 and slot 46 at the top of the heat sink. The channel 44, 44b (FIGS. 6, 17) provides flexibility for the user to adjust the suspension/mounting hardware to a position anywhere along the length of the luminaire. Second, at the interface between the end cap 22, 64, 78 and the end face of the heat sink/housing 16, 62, 76, respectively, is a boss 52 protruding from the end cap. This boss 52 inserts into a corresponding opening 54 on the end face of the heat sink. The boss 52 features the tapped hole 58 (or plain hole for an interference fit with a pin or rivet) that aligns with the corresponding hole 56 through the vertical plane of the heat sink (FIGS. 4, 6-9, 13 and 17-20). The end cap can be fastened through the top of the luminaire so that the "hidden" fastener 59 is not visible to an observer (e.g., when the luminaire is positioned vertically with the fastener on top or horizontally with the fastener against the wall). See FIG. 4. Alternatively, there need not be holes 56, 58 as the end cap boss 52 could make an interference fit with the corresponding opening 54 in the housing. Alternatively, the housing/heat sink may have a boss which mates with an opening in the end cap. Additionally, the use of a boss 52 improves the alignment of the fins 24 on the end cap 22, 64, 78 with the fins 20 on the heat sink 16, 62, 76, respectively, compared to two flat faces that are held together with a single screw. Additional fasteners could be used, but may not maintain the slim profile of the heat sink of the luminaire. Third, the bottom of the end cap features a cavity 42 that accommodates the end of the lightguide (FIG. 9). Each of a plurality of fasteners 88 inserts through an opening 89 in the front plate 37 or end cap (e.g., end cap 64), through a hole 90 in the lightguide 26, and into a threaded opening 91 on the removable rear plate or rear portion of the end cap, or rear portion of the housing if no removable rear plate is used, to secure the lightguide in place (FIGS. 3, 10 and 11). Alternatively, the lightguide may have no through holes and instead set screws are inserted through the opening 89 in the removable front plate, for example, to compressively hold the lightguide inside the housing. The end face 92 of the end cap 22, 64, 78 provides an aesthetic finish and an ideal location for logos or text.

Figure 25:
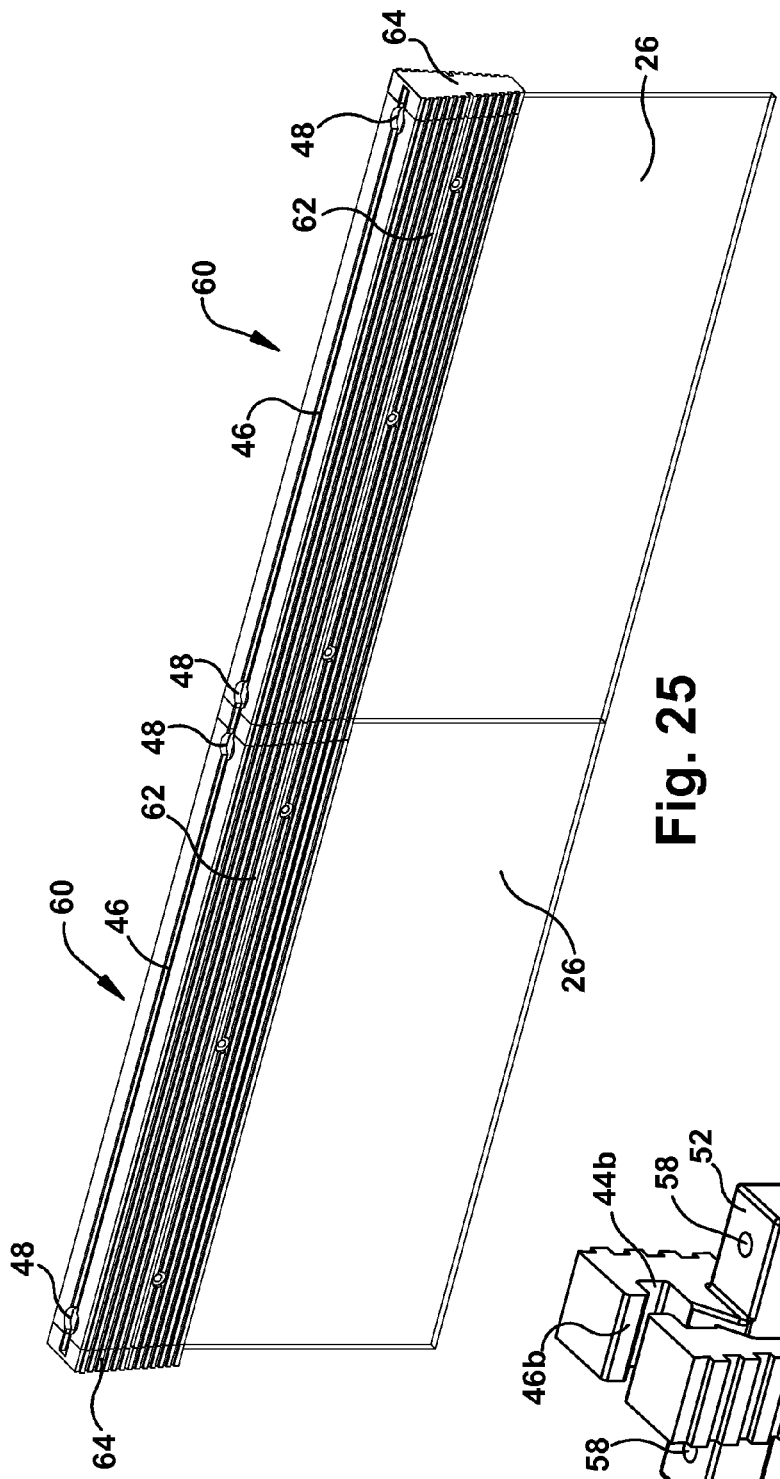
FIG. 25 is a perspective view of two edge lit luminaires of the second embodiment connected with a connecting end cap shown in FIG. 26.
Figure 26:
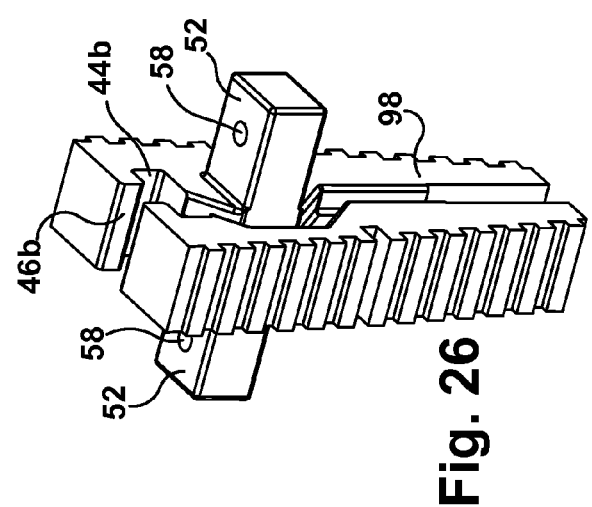
Figure 30:
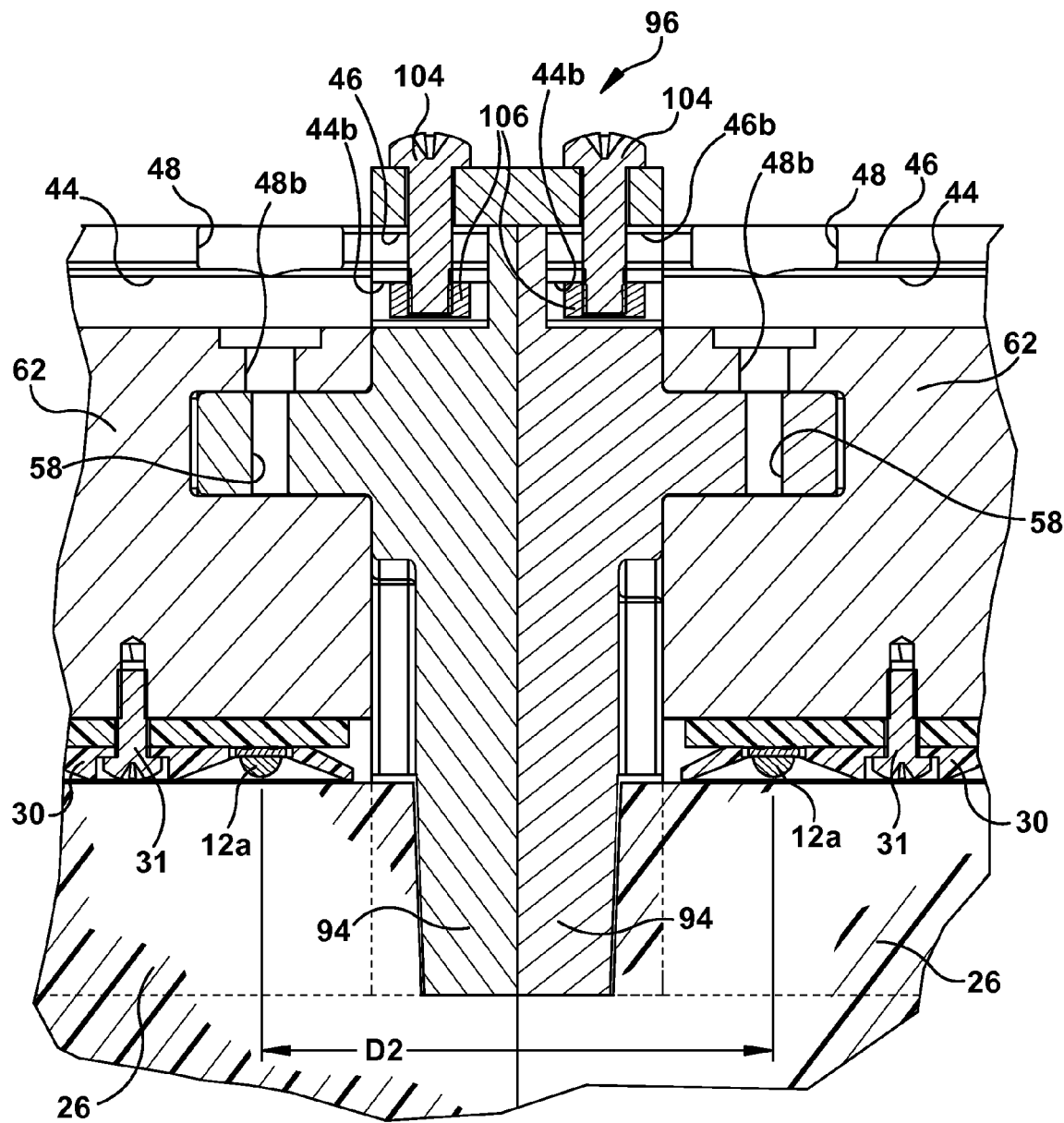
FIG. 30 is a cross-sectional view of the two luminaires connected together with the connected two terminating end caps.
Figure 31:
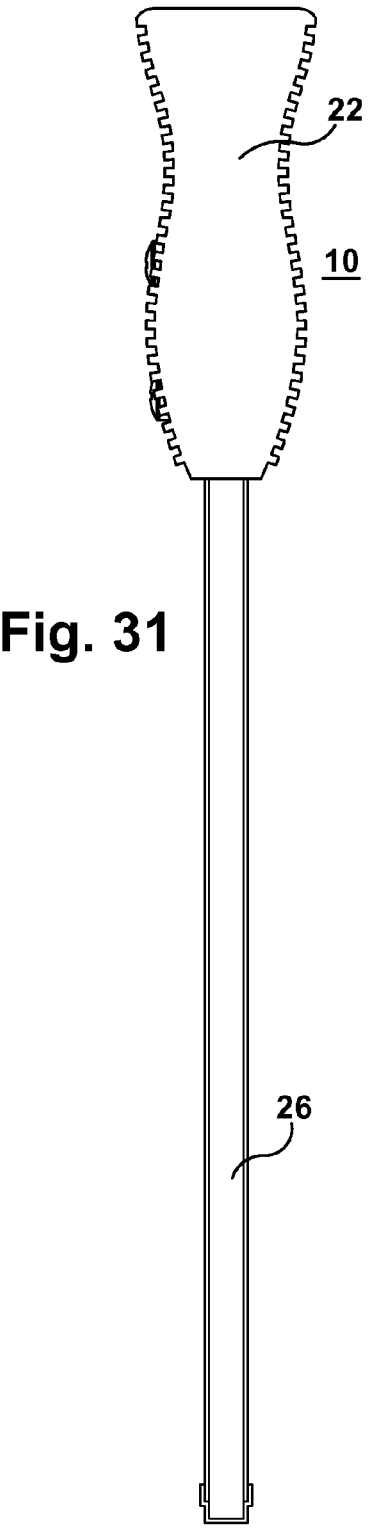
FIG. 31 is an end view of the edge-lit luminaire of the first embodiment adapted to receive a film or plate around the lightguide.

Two varieties of end caps 22 may be used: a terminating end cap (e.g., the end cap 22, 64, 78) and a connecting end cap. The terminating end cap is typically used on a single heat sink luminaire in which no other heat sinks will be in the vicinity (FIGS. 1 and 10). However, terminating end caps 94 can be joined together with a connecting member 96 (FIGS. 28-30). A connecting end cap 98 can be used when two heat sinks of the luminaires will be placed end to end and joined via the end cap (FIGS. 25-27). The LED spacing on a heat sink that is connected with other heat sinks can be close to uniform from one heat sink to another. Therefore, two luminaires that are butted together with a connecting end cap or terminating end caps between them could have a distance D2 between the first or outermost LED 12a on one luminaire and the first or outermost LED 12a on the next luminaire ranging from one to two pitch lengths (FIGS. 27 and 30).

Referring to FIGS. 25-27 regarding the luminaire of the second embodiment (but equally applicable to the other embodiments of this disclosure), one type of connecting end cap 98 is shared by two luminaires 60. The connecting end cap 98 may include two bosses 52 fitted into two openings in the housing 54. The connecting end cap 98 may include a recess 44b and a slot 46b that are aligned with the recess 44 and slot 46 of the housing. Openings 48b can extend between the channel and boss for receiving fasteners that connect the connecting end cap 98 to each luminaire 60.

In another aspect shown in FIGS. 28-30, terminating end caps 94 connect two distinct end-to-end butted luminaires 60 of the second embodiment. Openings 48b can extend between the channel and boss for receiving fasteners that connect the end cap 94 to each luminaire 60. The connecting member 96 includes a plate 100 with openings 102. Fasteners 104 pass through the openings 102 and nuts 106 are received in the recess portion 44b, which connects the end caps 94 and both distinct luminaires 60 together. The connecting end caps may also be tapered or rounded such that two or more luminaires can be connected at an angle (i.e., non-linearly).

Figure 15:
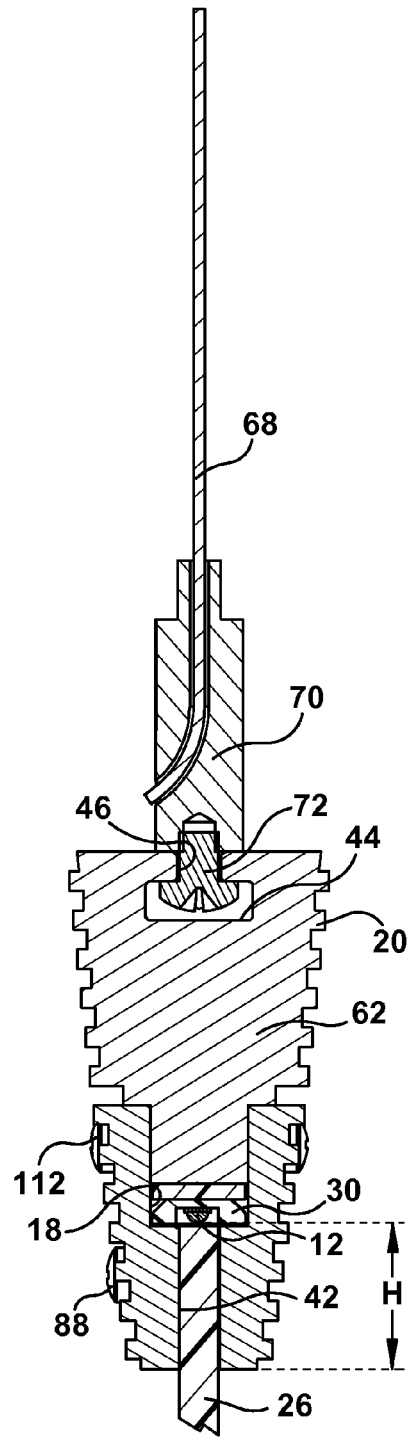
FIGS. 15 and 16 are cross-sectional views from an end of the luminaire of the second embodiment.
Figure 16:
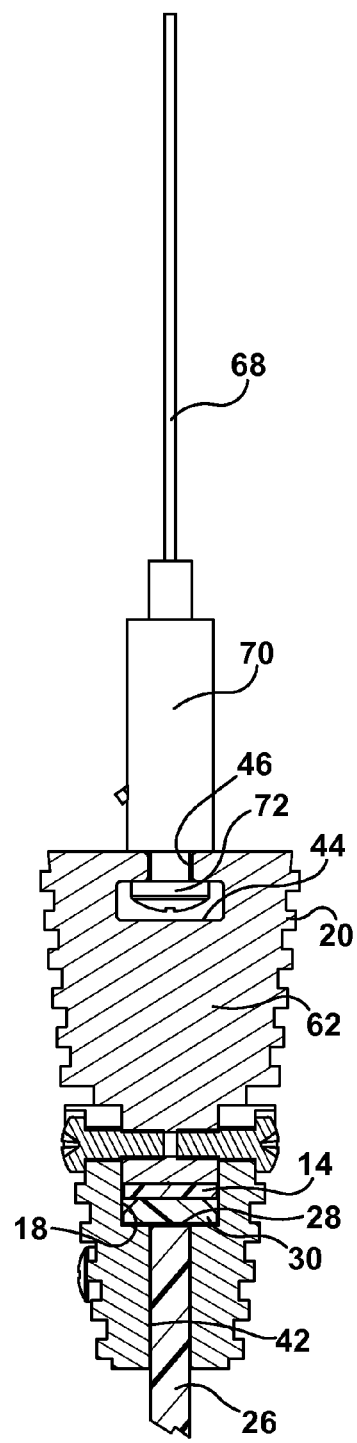
Figure 17:
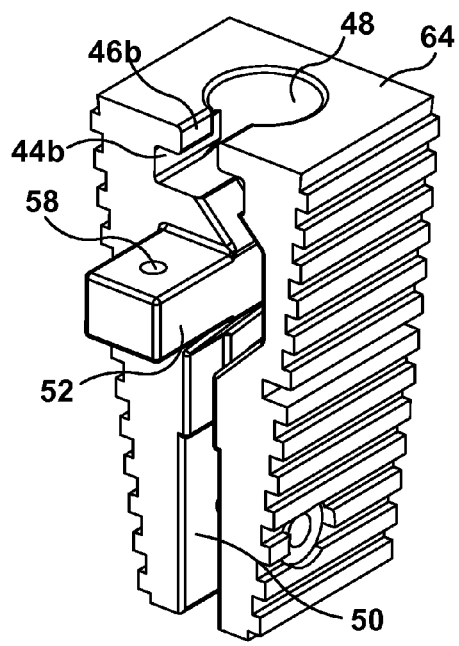
FIGS. 17-20 are perspective, front, top and cross-sectional views of an end cap that can be connected to the housing of the edge lit luminaire of the second embodiment.
Figure 19:
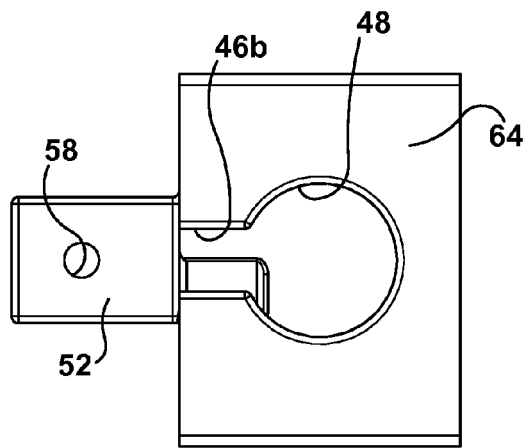
Figure 18:
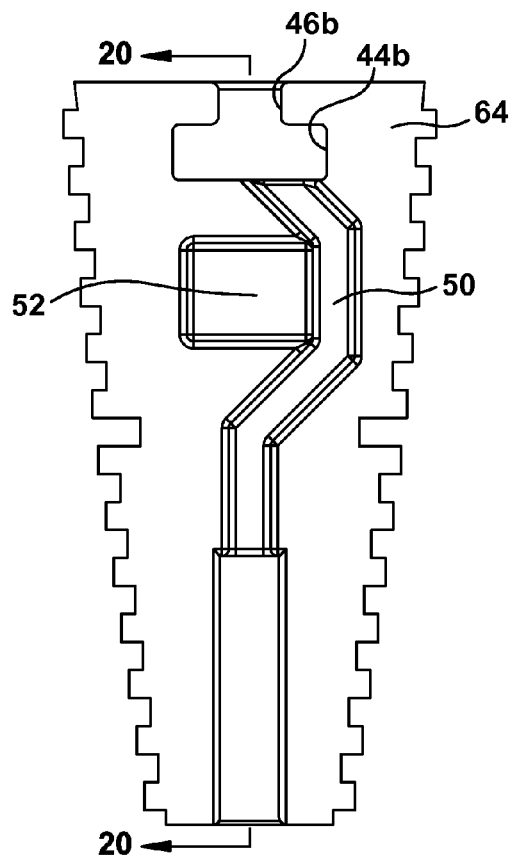
Figure 20:
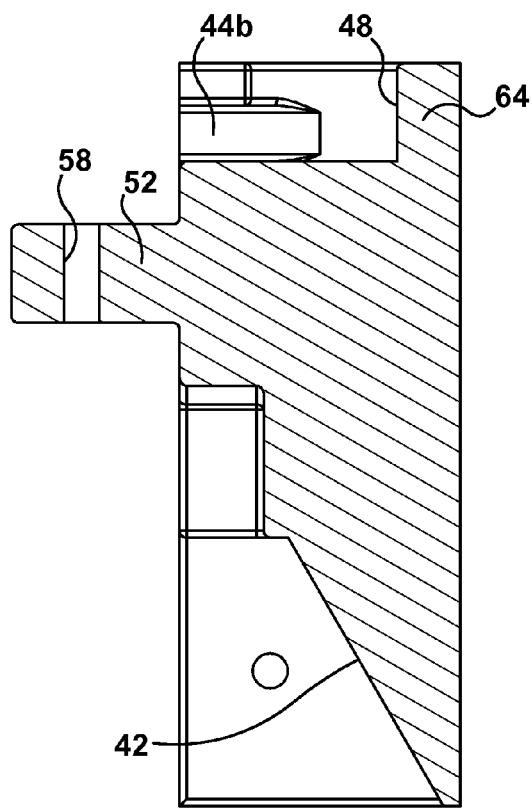

Heat Sink:

The heat sink 16, 62, 76 comprises a bulk structure and a removable front plate 37 and/or removable back plate 108 (FIG. 11). If the heat sink were a single piece, the assembler would have to slide the boards and reflector cups in from the edge, through a cavity that is, by design, only slightly larger than the light engine assembly. Further, attaching the light engine to the heat sink requires a number of fasteners 31. A single heat sink only has an approximately 4 mm width of the opening 42 to accommodate the lightguide, which is the same space to fit the fastener and the tool used to secure the fastener to the heat sink (FIGS. 3, 15 and 16). This small space creates a cumbersome situation for properly securing the light engine. Instead, the removable front plate 37 is used to allow the assembler to attach the light engine boards with reflector cups to the surface on the bulk heat sink without major difficulty. The front plate 37 is fastened to the body of the heat sink 110 using fasteners 112 extending in openings 114 through the front plate into openings 116 in the housing body 110 (FIGS. 3 and 11). A seam 77 between the front plate and bulk of the heat sink 70 is nearly invisible (FIGS. 10 and 11).

In an alternative embodiment, a removable rear plate 108, which closely mirrors the front plate 37, may be used to allow even more access for mounting the light engine on the heat sink. The rear plate 108 may be fastened to the housing by fasteners 118 through openings 120 of the rear plate 108 aligned with openings in the body 110 of the housing (FIG. 11). The drawbacks to this alternative embodiment is that it adds another part to the luminaire, it introduces additional thermal resistance in the heat sink, and it leaves less room for threads to fasten the front plate to the rear plate. The minimum thread engagement of a specific M3 fastener into the heat sink is about 3 mm. By keeping the bulk heat sink intact (i.e. eliminating the rear plate), the allowable thread engagement may be 6 mm or more, which is a suitable engagement. If no rear cover plate is needed, one side of the housing will have no visible fasteners, which is suitable for horizontal application.

Figure 23:
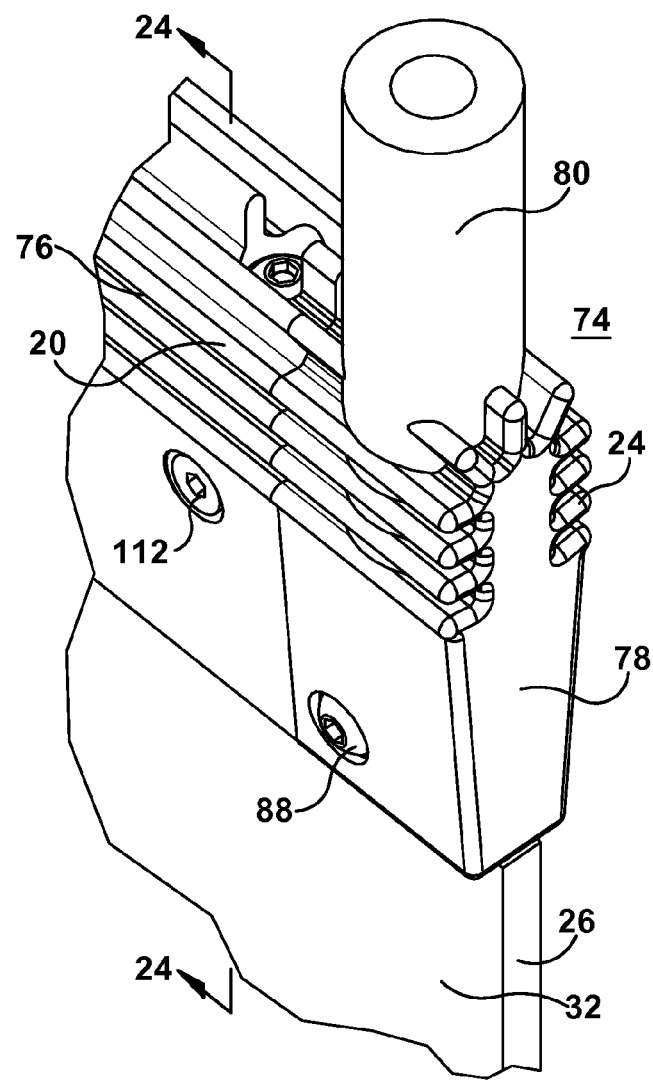
FIG. 23 shows perspective end view of the end cap of the luminaire of the third embodiment.

In a third embodiment, referring to FIGS. 22-24, the removable front and/or rear plates have bosses or tabs (e.g., tabs 84 of back plate 82) that run the length of the plate instead of holes. The boss or tab mates with a corresponding cavity in the heat sink (e.g., cavity 86) so that the front and/or rear plates press or slide into place in the heat sink, which eliminates the need for fasteners. In one embodiment, the tab 84 is a dovetail tab that slides into the heat sink cavity 86 from the end (FIG. 24). In another embodiment, the tab may consist of a series of pins that are press fit into the heat sink.

Lightguide:

The lightguide 26 is optical grade transparent material, e.g., acrylic, for superior optical properties. The thickness of the acrylic lightguide is governed by two parameters. First, the lightguide may be larger than the LED's inherent optic, which may be a 2.8 mm diameter dome or even larger. The dome covers the actual light-emitting chip on the LED and is there for optical purposes. Not all LEDs have domes like this, but it is understood that this dome is a component of the LED itself. A reflector and/or collimator (e.g., lens) 30 around each LED 12 is desirable to direct light into the lightguide in a specific manner. As lightguide thickness increases, more flexibility with the reflector/collimator is gained. Second, the maximum thickness of acrylic that is easily manufactured into a lightguide is 4 mm. Therefore the lightguide thickness is specifically 4 mm. The lightguide also has a plurality of through holes 90 near the LED coupling, which are used to accommodate fasteners 88 that secure the lightguide in place. These holes can be located half way between consecutive LEDs at a distance of about 5 mm or less from the light-coupling edge of the lightguide. This location reduces shadowing created by the through hole and fastener and minimizes the effect on the light that reaches the observer. An additional aesthetic feature of the lightguide is that it is transparent (main aspect) or translucent (alternative aspect) when the luminaire is turned off. Alternatively, the lightguide may have no through-holes and may be held in place with set screws.

Light-Extraction:

The lightguide 26 contains light-extracting features on a light extraction surface 32 that extract light that would otherwise be trapped inside the lightguide due to total internal reflection. The light extraction surface that might be used is shown, for example, in U.S. Pat. No. 5,613,751 in FIGS. 4a-4d and in column 5, line 54 through column 6, line 20, which patent is incorporated herein by reference in its entirety. These light-extracting features may be of two varieties, for example: laser-etched pits or microlens structures. Laser-etched pits will scatter light in all directions while microlens structures will direct light in a preferential direction. Each of the light-extracting features may be arranged in a pattern of variable density, i.e. a region on the lightguide surface that is far away from the light engine will have more light-extracting features than a region on the same surface that is closer to the light engine. The variable density and light-extracting feature shape control both luminance and illuminance uniformity, such that the lightguide may appear uniform to an observer and/or the area illuminated by the luminaire may achieve a desirable distribution and light level. The light-extracting features may be optimized for a luminaire oriented vertically (lightguide is perpendicular to the ground) or horizontally (lightguide is parallel to the ground) based on the desired distribution of light. For example, a vertical luminaire is appropriate if mounted above the aisle of a supermarket and light is desired to be on the shelves to either side of the luminaire.

Wiring:

The light engine connects to a power supply unit (PSU). The PSU can be located remotely (i.e. inside a ceiling grid or otherwise out of primary sight) from the suspended or surface-mounted luminaire. Since the light engine is embedded in the heat sink, a passageway or channel 50 is present in the heat sink to permit the exit of the electrical wires extending between the PSU and the LEDs 12 (leads of the circuit board on which the LEDs are electrically connected). There are two locations that are appropriate for this channel 50, one is in the center of the luminaire (FIG. 5) and the other is in the end cap 22 (FIG. 4). One way to design the electrical wire channel 50 is shown in FIGS. 17-20, since the trapezoidal shape of the housing and end cap 64 allows enough room to have the wire channel 50 go around the end cap boss 52. Another way is to use a vertical or straight wire channel 50 as shown in FIGS. 6-9, which would work on an hour glass shaped end cap 22, but would be more difficult to manufacture and less robust.

Size:

The luminaire in the vertical orientation can have a size, for example, of approximately 1200 mm long×200 mm high or wide×25 mm thick.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

It should be appreciated that various changes can be made to the edge lit luminaire described in the Brief Description and Detailed Description that still fall within this disclosure. For example, the light source is any light source that is suitable for edge lit illumination including lasers. The shape, size and position of the fins can vary from what is shown in the drawings. The dimensions of the various components and features of the luminaire can vary. Other ways may be used for securing the end caps to the housing. The housing can have a variety of end profiles. The cavity and channel in the housing may have a different shape than what is shown in the drawings. A variety of different fasteners may be used to secure the housing to a support surface via the channel. The lightguide may have different shapes and employ various light extraction features so long as a reasonable illumination efficiency is achieved.

What is claimed is:

1. An edge lit luminaire comprising:
a light source;
a housing having an interior cavity for receiving said light source, wherein said housing includes or is a heat sink for directing heat away from said light source, wherein said housing includes opposing first and second surfaces, and a channel being disposed in said housing near said first surface that can receive a head of a fastener for mounting said luminaire to a support surface, a slot being disposed in said first surface in communication with and a smaller size than said channel for receiving a shank of the fastener;
at least one end cap secured to an end of said housing that covers said cavity;
a lightguide secured inside said housing and having an edge located in proximity to said light source, said lightguide being received in an opening in said second surface, said lightguide including a light extraction surface enabling light to be transmitted from said lightguide;
at least one of a reflector and a lens for directing light from said light source to said edge of said lightguide.

2. The edge lit luminaire of claim 1 wherein said light source includes a plurality of spaced apart light emitting diodes (LEDs).

3. The edge lit luminaire of claim 2 comprising a printed circuit board on which said LEDs are mounted.

4. The edge lit luminaire of claim 1 wherein said first surface includes an opening that is larger than a head of the fastener, said opening communicating with said channel.

5. The edge lit luminaire of claim 1 wherein said housing and said end cap include a plurality of fins at exterior surfaces thereof, and fins of said end caps are aligned with said fins of said housing.

6. The edge lit luminaire of claim 1 wherein said housing has an hourglass shape as viewed from the ends of said housing.

7. The edge lit luminaire of claim 1 wherein said housing has a shape of a trapezoid as viewed from the ends of said housing.

8. The edge lit luminaire of claim 1 wherein said lightguide has a planar or tapered shape.

9. The edge lit luminaire of claim 8 wherein a width of said lightguide extends between two spaced apart ends of said lightguide and said housing is disposed at only one of said ends.

10. The edge lit luminaire of claim 1 wherein said housing includes a removable side section permitting access to said cavity.

11. The edge lit luminaire of claim 1 comprising a passageway that communicates inside said housing between said channel and said cavity, whereby said passageway receives electrical wires connected to leads of said circuit board that are in electrical connection with said light source.

12. The edge lit luminaire of claim 1 wherein one of said housing and each said end cap includes a boss and the other of said housing and each said end cap includes an opening for receiving said boss.

13. An edge lit luminaire comprising:
a light source;
a housing having an interior cavity for receiving said light source, wherein said housing includes or is a heat sink for directing heat away from said light source;
a connecting member that joins two of said housings placed end to end;
at least one end cap secured to an end of said housings that covers said cavity;
a lightguide secured inside said housings and having an edge located in proximity to said light source, said lightguide including a light extraction surface enabling light to be transmitted from said lightguide; and
at least one of a reflector and a lens for directing light from said light source to said edge of said lightguide.

14. The edge lit luminaire of claim 13 wherein said light source comprises a plurality of spaced apart light emitting diodes (LEDs); a support structure on which said LEDs are mounted; and said housing includes said interior cavity for receiving said LEDs and in which said support structure is located.

15. The edge lit luminaire of claim 14 wherein said support structure comprises a printed circuit board, wherein said circuit board is metal clad or an unclad polymer.

16. The edge lit luminaire of claim 14 wherein said housing includes opposing first and second surfaces, said lightguide being received in an opening in said second surface, and a channel being disposed in said housing near said first surface that can receive a head of a fastener for mounting said luminaire to a support surface, a slot being disposed in said first surface in communication with and a smaller size than said channel for receiving a shank of the fastener.

17. The edge lit luminaire of claim 16 wherein said first surface includes an opening that is larger than a head of the fastener that communicates with said channel.

18. The edge lit luminaire of claim 16 comprising a passageway that communicates inside said housing between said channel and said cavity, whereby said passageway receives electrical wires connected to leads of said circuit board that are in electrical connection with said LEDs.

19. The edge lit luminaire of claim 16 wherein one of said housing and said end cap includes a boss and the other of said housing and said end cap includes an opening for receiving said boss.

20. The edge lit luminaire of claim 14 wherein said housing and said end cap include a plurality of fins at exterior surfaces thereof, and said fins of said end cap are aligned with said fins of said housing.

21. The edge lit luminaire of claim 14 wherein said housing has an hourglass shape as viewed from the ends of said housing.

22. The edge lit luminaire of claim 14 wherein said housing has a shape of a trapezoid as viewed from the ends of said housing.

23. The edge lit luminaire of claim 14 wherein said lightguide has a planar or tapered shape.

24. The edge lit luminaire of claim 23 wherein a width of said lightguide extends between two spaced apart ends of said lightguide and said housing is disposed at only one of said ends.

25. The edge lit luminaire of claim 14 wherein said housing includes a removable side section permitting access to said cavity.

26. The edge lit luminaire of claim 14 wherein said LEDs are spaced apart from each other by a pitch length, and first said LEDs in adjacent said housings are spaced apart from each other by a distance D2 ranging between one and two said pitch lengths.

27. An edge lit luminaire comprising:
a plurality of spaced apart light emitting diodes (LEDs);
a support structure on which said LEDs are mounted;
a housing having an interior cavity for receiving said LEDs and in which said support structure is located, wherein said housing includes or is a heat sink for directing heat away from said LEDs;
at least one end cap secured to an end of said housing that covers said cavity;
a lightguide secured inside said housing and having an edge located in proximity to said LEDs, said lightguide including a light extraction surface enabling light to be transmitted from said lightguide; and
at least one of a reflector and a lens that directs light from said LEDs to said edge of said lightguide,
wherein said LEDs are spaced apart from each other by a pitch length and a first LED closest to said end cap is disposed at a distance D1 of between ½ and 1 said pitch length from an end of said end cap.

28. An edge lit luminaire comprising:
a plurality of spaced apart light emitting diodes (LEDs);
support structure on which said LEDs are mounted;
a housing having an interior cavity for receiving said LEDs and in which said support structure is located, wherein said housing includes or is a heat sink for directing heat away from said LEDs;
wherein said housing includes opposing first and second surfaces and a channel disposed in said housing near said first surface that can receive a fastener for mounting said luminaire to a support surface, a slot being disposed in said first surface in communication with and a smaller size than said channel for receiving a shank of the fastener;
a lightguide disposed in an opening in said second surface of said housing and having an edge located in proximity to said LEDs, said lightguide including a light extraction surface enabling light to be transmitted from said lightguide; and
at least one of a reflector and a lens that directs light from said LEDs to said edge of said lightguide.

29. An edge lit luminaire comprising:
a plurality of spaced apart light emitting diodes (LEDs) disposed on a support structure, said LEDs being spaced apart from each other by a pitch length P;
a housing having an interior cavity for receiving said LEDs and in which said support structure is located, wherein said housing includes or is a heat sink for directing heat away from said LEDs;
a lightguide disposed in an opening in said housing and having an edge located in proximity to said LEDs, said lightguide including a light extraction surface enabling light to be transmitted from said lightguide;
a reflector that directs light from one of said LEDs to said edge of said lightguide, wherein said reflector has a length that is less than or equal to said pitch length and has a width that is less than or equal to a width of said edge;
wherein said optic said reflector includes a cup surrounding said LED, wherein a depth of said cup is approximately equal to a depth of said LED and any inherent optic component of said LED.

30. An edge lit luminaire comprising:
a plurality of spaced apart light emitting diodes (LEDs) disposed on a support structure;
wherein said support structure comprises a printed circuit board on which said LEDs are connected, said LEDs being spaced apart from each other by a pitch length P;
a housing having an interior cavity for receiving said LEDs and in which said support structure is located, wherein said housing includes or is a heat sink for directing heat away from said LEDs;
fasteners mounting said circuit board to said housing between said LEDs, each said fastener having a head;
a lightguide disposed in an opening in said housing and having an edge located in proximity to said LEDs, said lightguide including a light extraction surface enabling light to be transmitted from said lightguide;
at least one of a reflector and a lens optic that directs light from one of said LEDs to said edge of said lightguide,
wherein the at least one reflector and lens optic has the following:
a width that is less than or equal to a width of said edge and a length that is less than said pitch length P by a distance that is greater than or equal to a diameter of said head of said fastener.

31. An edge lit luminaire comprising:
a plurality of spaced apart light emitting diodes (LEDs) disposed on a support structure;
said LEDs being spaced apart from each other by a pitch length P;
a housing having an interior cavity for receiving said LEDs and in which said support structure is located, wherein said housing includes or is a heat sink for directing heat away from said LEDs;
a lightguide disposed in an opening in said housing and having an edge located in proximity to said LEDs;
at least one of a reflector and a lens optic that directs light from one of said LEDs to said edge of said lightguide, said lightguide including a light extraction surface enabling light to be transmitted from said lightguide;
wherein there is a mixing zone height H located between an apex of said LEDs to an outer surface of said housing at said opening, wherein H/P is greater than about 0.8;
wherein the at least one reflector and lens optic has a length that is less than or equal to said pitch length and has a width that is less than or equal to a width of said edge.

32. The edge lit luminaire of claim 31 wherein H/P ranges from 0.8 to 1.

33. An edge lit luminaire comprising:
a plurality of spaced apart light emitting diodes (LEDs) disposed on a support structure, said LEDs being spaced apart from each other by a pitch length P;
a housing having an interior cavity for receiving said LEDs and in which said support structure is located, wherein said housing includes or is a heat sink for directing heat away from said LEDs;
a lightguide disposed in an opening in said housing and having an edge located in proximity to said LEDs, and a film on said lightguide that includes letters, symbols, or graphics printed, engraved, or embossed thereon enabling light to be transmitted from said lightguide;
at least one of a reflector and a lens optic that directs light from one of said LEDs to said edge of said lightguide;
wherein the at least one reflector and lens optic has a length that is less than or equal to said pitch length and has a width that is less than or equal to a width of said edge.

34. An edge lit luminaire comprising:
a plurality of light emitting diodes (LEDs);
a housing having an interior cavity for receiving said LEDs, wherein said housing includes or is a heat sink for directing heat away from said light source;
a lightguide secured inside said housing and having an edge located in proximity to said LEDs, a light transmitting film or plate on side surfaces of said lightguide, said film including letters, symbols, or graphics printed, engraved or embossed thereon enabling light to be transmitted from said lightguide;
at least one of a reflector and a lens for directing light from said LEDs to said edge of said lightguide; and
a clip secured to an edge of said lightguide remote from said housing that retains said film or plate against said lightguide.

* * * * *

UNITED STATES PATENT AND TRADEMARK OFFICE
CERTIFICATE OF CORRECTION

| | | |
|---|---|---|
| PATENT NO. | : 8,764,264 B2 | Page 1 of 1 |
| APPLICATION NO. | : 13/363881 | |
| DATED | : July 1, 2014 | |
| INVENTOR(S) | : Knapp et al. | |

It is certified that error appears in the above-identified patent and that said Letters Patent is hereby corrected as shown below:

In the Specification

Column 6, line 37; please delete "FIGS. 10-20)" and replace with "FIGS. (10-20)"

Signed and Sealed this
Seventh Day of October, 2014

Michelle K. Lee
*Deputy Director of the United States Patent and Trademark Office*